(12) United States Patent
Daikeler et al.

(10) Patent No.: US 7,699,753 B2
(45) Date of Patent: Apr. 20, 2010

(54) METHOD AND APPARATUS FOR CREATING A VIRTUAL WORKOUT COMMUNITY

(75) Inventors: Carl Daikeler, 8383 Wilshire Blvd., Beverly Hills, CA (US) 90211; Erick V. Hoppe, Stevenson Ranch, CA (US); Yvonne Meier-Hull, Glendale, CA (US); Caroline E. Kelley, Playa Vista, CA (US)

(73) Assignee: Carl Daikeler, Beverly Hills, CA (US)

( * ) Notice: Subject to any disclaimer, the term of this patent is extended or adjusted under 35 U.S.C. 154(b) by 1223 days.

(21) Appl. No.: 11/046,330

(22) Filed: Jan. 29, 2005

(65) Prior Publication Data

US 2005/0192156 A1    Sep. 1, 2005

Related U.S. Application Data

(60) Provisional application No. 60/540,876, filed on Jan. 30, 2004, provisional application No. 60/586,817, filed on Jun. 28, 2004.

(51) Int. Cl.
*A63B 71/00* (2006.01)
(52) U.S. Cl. .................. 482/8; 482/1; 482/9; 434/247
(58) Field of Classification Search ............... 482/1–9, 482/51, 54, 900–902; 434/247
See application file for complete search history.

(56) References Cited

U.S. PATENT DOCUMENTS

| | | | |
|---|---|---|---|
| 6,013,007 A | 1/2000 | Root et al. | |
| 6,039,688 A | 3/2000 | Douglas et al. | |
| 6,283,896 B1 * | 9/2001 | Grunfeld et al. | 482/54 |
| 6,616,578 B2 | 9/2003 | Alessandri | |
| 6,645,124 B1 | 11/2003 | Clem | |
| 6,722,888 B1 | 4/2004 | Macri et al. | |
| 6,902,513 B1 | 6/2005 | McClure | |
| 7,060,006 B1 | 6/2006 | Watterson et al. | |
| 2001/0004622 A1 | 6/2001 | Alessandri | |
| 2002/0045519 A1 | 4/2002 | Watterson et al. | |
| 2002/0055419 A1 * | 5/2002 | Hinnebusch | 482/8 |
| 2002/0070954 A1 | 6/2002 | Lang | |
| 2002/0142887 A1 | 10/2002 | O'Malley | |
| 2003/0009376 A1 | 1/2003 | Ekstrom | |

(Continued)

OTHER PUBLICATIONS

PCT Search Report for International Patent Application No. PCT/US05/02707 dated Aug. 21, 2006.

*Primary Examiner*—Glenn Richman
(74) *Attorney, Agent, or Firm*—Connolly Bove Lodge & Hutz LLP

(57) ABSTRACT

A method for creating a virtual online gym for providing members with a shared workout experience and decreasing the feeling of isolation when members are not all working out at the same physical location. The method including the steps of receiving a request for access to the virtual online gym and receiving a selection for a first exercise program from a plurality of available exercise programs from the first member. The method also includes the steps of determining a program length based on the selection of the first exercise program; presenting updated status information during a length of the program length; and, providing a notification when the program length has been reached. An apparatus and system for implementing the method are also disclosed.

19 Claims, 43 Drawing Sheets

U.S. PATENT DOCUMENTS

| | | |
|---|---|---|
| 2003/0078786 A1 | 4/2003 | Ulrey |
| 2003/0149614 A1 | 8/2003 | Andrus et al. |
| 2003/0216185 A1 * | 11/2003 | Varley .......................... 463/42 |
| 2006/0063644 A1 * | 3/2006 | Yang ............................ 482/4 |

* cited by examiner

WOWY™
WORK OUT WITH YOU

There are 2527 people working out right now....

WOWY MEMBER PAGE

| MAKE YOUR WORKOUT COUNT |
|---|

WOWY AND SUPPORT
TEAM MEMBERS LOGIN:      GO       WOWY GUEST LOGIN:      GO
                                  choose a screen name USERNAME    PASSWORD              [8 Char. Max]
            forgot password?      BECOME A MEMBER–IT'S FREE!

SEE WHO'S WOWY NOW
SEE WHO'S WOWY LATER

TOP 3
1) Power 90
2) Slim In 6
3) Yoga Booty Ballet

UPCOMING GROUP WORKOUT: P90XPLORERS

Workout with Beachbody CEO, Carl Diakeler in WOWY Now tonight at 8:00pm ET/5:00pm PT. Carl will be leading the P90XPLORERS group.

LEARN ABOUT WOWY
WOWY GROUPS
COOL DOWN CHATROOM

JOIN THIS GROUP     VIEW ALL GROUPS

MEET 2 OF THE 2527 PEOPLE WHO ARE WOWY RIGHT NOW!

toto2 in California
Goal: Going all the way
Current workout:
Power 90 / Sculpt 3-4
Approx. workout finish:
4:41 PM ET/1:41 PM PT toto2 in California
Goal: Going all the way
Current workout:
Power 90 / Sculpt 3-4
Approx. workout finish:
4:41 PM ET/1:41 PM PT

CHECK OUT WHO ELSE IS WOWY NOW!

FIG. 3

WOWY™
WORK OUT WITH YOU

There are people working out right now...

Welcome, bosnia. To begin a new workout, click WOWY NOW, or pick your category below.

WOWY MEMBER PAGE

WOWY SCHEDULER
WOWY GROUPS
BBST LOCKER
UPDATE PROFILE
LOGOUT

Space for Ad

WOWY NOW!

WOWY SCHEDULER

Plan your workouts and let your fellow WOWY buddies know about your schedule.

Create My Scheduler

Reset My Scheduler

WOWY GROUPS

My Workout Groups
None

Join or Leave A Workout Group

About Workout Groups

© 2004 WOWY.com and Product Partners, LLC.

WOWY™
WORK OUT WITH YOU

There are people working out right now....

2 Total working out
1 Walk/Jog/Treadmill
1 20-minutes of
  Walking/Jogging

The time right now is:
6:33 PM ET/3:33 PM PT

BEGIN YOUR WORKOUT NOW AND CLICK "DONE" WHEN FINISHED

You have approximately 25 minutes left in your workout

CANCEL          DONE

Space for Ad

YOUR TEAMMATES

1 barbie's splits routine bosnia in Delaware

Current workout:
Walk/Jog/Treadmill / 20-minutes of
Walking/Jogging
Approx. workout finish:
6:57 PM EST/3:57 PM PST

All Teammates yvonneh in California

Goal: Get website done by Monday
Current workout:
Yoga Booty Ballet
Approx. workout finish:
6:45 PM EST/3:45 PM PST

FIG. 15

WOWY
WORK OUT WITH YOU

There are people working out *right now*...

WOWY MEMBER PAGE

CREATE A WOWY SCHEDULER FOR bosnia

WOWY SCHEDULER
WOWY GROUPS
BBST LOCKER
UPDATE PROFILE
LOGOUT

1. START DATE
Have you started your fitness regimen yet?

◉ No

○ Yes, I started a my program on: | January ▾ | 30 ▾ | 2004 ▾ |

2. TIME ZONE
What time zone will you be using to schedule workouts? | ET ▾ |

3. ACTIVITIES
Which fitness activities would you like to schedule? Hold down the CTRL button (PC) or COMMAND button (Mac) to select multiple activities.

| -- VIDEOS -- |
| Power 90 |
| Slim In 6 |
| Yoga Booty Ballet |
| Power Half Hour |
| Slim Series |
| Great Body Guaranteed |
| Ho'Ala Ke Kino |
| Keep It Up! |
| Tony and the Kids |

Hint: You can always add others later.

Submit

Space for Ad

Space for Ad

Space for Ad

Space for Ad

WOWY™
WORK OUT WITH YOU

There are people working out right now...

WOWY MEMBER PAGE

CHANGE ACTIVITIES FOR bosnia

WOWY SCHEDULER
WOWY GROUPS
BBST LOCKER
UPDATE PROFILE
LOGOUT

Check the activities you would like to add to your Scheduler and uncheck any activities you would like to delete.

VIDEOS
- ☑ Power 90
- ☐ Slim in 6
- ☐ Yoga Booty Ballet
- ☐ Power Half Hour
- ☐ Slim Series
- ☐ Great Body Guaranteed
- ☑ Ho 'Ala Ke Kino
- ☐ Keep It Up!
- ☑ Tony and the Kids
- ☐ Tony and the Folks

OTHER
- ☐ Walk/Jog/Treadmill
- ☐ Cardio/Aerobics
- ☐ Yoga
- ☐ Weightlifting
- ☐ Bicycling
- ☐ Swimming Submit My Changes Space for Ad
Space for Ad
Space for Ad
Space for Ad © 2004 WOWY.com and Product Partners, LLC.

METHOD AND APPARATUS FOR CREATING A VIRTUAL WORKOUT COMMUNITY

CLAIM OF PRIORITY UNDER 35 U.S.C. §119

The present Application for Patent claims priority to Provisional Application No. 60/540,876 entitled "ONLINE VIRTUAL GYM" filed Jan. 30, 2004, and Provisional Application No. 60/586,817 entitled "METHOD AND APPARATUS FOR GROUP SCHEDULING" filed Jun. 28, 2004; both of which are assigned to the assignee hereof

BACKGROUND

1. Field of the Invention

The present invention relates generally to online fitness applications, and more particularly, to an online virtual gym that provides group scheduling and group member participation accountability.

2. Background of the Invention

Many current proposals exist to motivate individuals to exercise ("workout") workout at a gym. However, for most individuals, there are many reasons the individual would rather exercise ("workout") at home than at a gym—the need to drive to the gym is eliminated, the requirement to conform to a rigorous schedule (such as the set by the gym) is reduced, membership and other costs are eliminated, and the individual can perform other chores, such as making dinner or doing laundry during the workout.

One negative aspect of not working out in a gym is that the individual will not be able to enjoy the camaraderie the gym setting provides. For example, when the individual goes to a gym, the individual can chat with fellow classmates before or after the class or exercise session and tell them: "See you tomorrow." That little phrase encourages everyone to show up again. When the individual works out at home, however, that interaction and the resulting motivation is not easily achieved. For example, working out alone in a home setting typically means that the individual will not have accountability to others of missing a workout to which the individual has committed. Further, an individual working out at home will not be able to see if his or her fellow classmates have worked out.

Accordingly, there is a need to overcome the issues noted above.

SUMMARY OF THE PREFERRED EMBODIMENTS

The present invention provides an online gym system to provide individuals with a shared workout experience and decrease the feeling of isolation when the individuals are working out at home. Individuals can join workout groups to welcome "members" and see the other members in their workout groups who are simultaneously working out. After the group members have completed their workout, they can chat in one or more chat rooms. The present invention further provides a system for group scheduling of a workout in the online gym system to provide members with a shared workout experience, provide motivation, and decrease the feeling of isolation when working out at home. The group scheduling system provides for accountability on the part of each member of the workout group to attend the workout session as committed to their "Success Buddies."

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which:

FIGS. 3-19 are various screen shots of the virtual online gym configured in accordance with one embodiment of the present invention.

FIGS. 22-35 are various screen shots of the group scheduling system configured in accordance with one embodiment of the present invention;

Like numerals refer to like parts throughout the several views of the drawings.

DETAILED DESCRIPTION OF THE INVENTION

Figure 1:
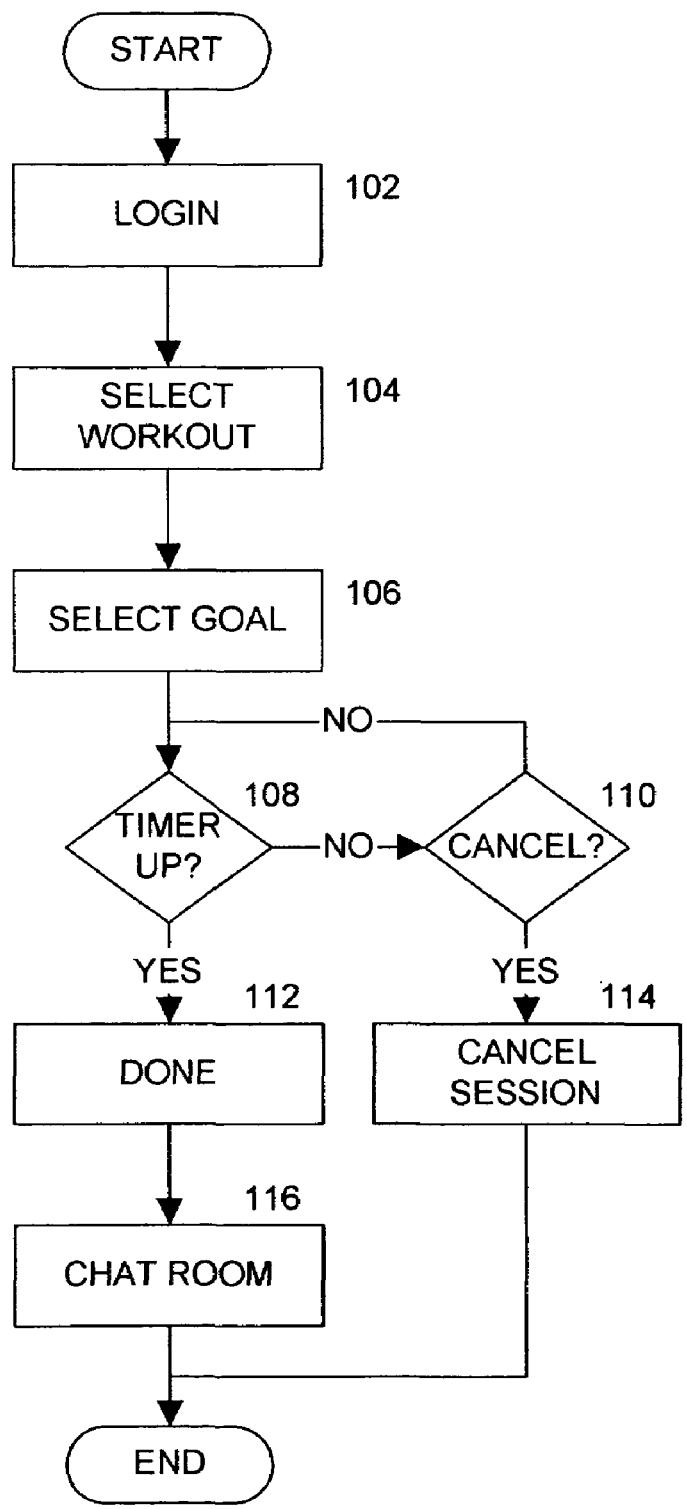
FIG. 1 is a flow diagram of the member login and workout tracking process configured in accordance to a preferred embodiment of the present invention.

The present invention is directed to a system that provides an online or "virtual" gym that allows members and guests to have a shared workout experience and decrease the feeling of isolation when working out at home or the office. The system is referred to as the "WorkOut With You" (WOWY) system. In addition, members can join one or more WOWY Workout Groups and see who else in their group(s) is working out at the same time. After they are done with their workout, they can chat in the Cool Down Chat Room.

In one preferred embodiment, the system is implemented as a web site that is accessible by any device capable of retrieving the web content and interacting with the system. For example, the web site may be hosted on one or more computer servers, with network connectivity to the Internet and accessible to client computers that are also connected to the Internet. Further, handheld devices such as mobile phones or "smart" phones and the like may also be used to interact with the site.

In one preferred embodiment, workout groups are made up of "Success Buddies" or "Buddies" that give each other encouragement and support before and after workouts. If an individual is willing to commit to exercising at a specific time and would like to chat with others who are also committed, the individual can join and become a member of the workout groups. In one preferred embodiment, each workout group has their own chat room that "opens" (available for access by members) a half-hour before the workout session begins. The chat room is open before the workout session to provide a "gathering place" for members, or Buddies, so that they can socialize before the session, as well as to provide motivation for those who need a "pep talk." The chat room remains open for 2 hours afterwards to allow Buddies to chat as they cool down and so that the Buddies can provide each other with further encouragement as well as motivation to attend future workouts. In other embodiments, the chat room may remain open all the time, or for other predetermined times before or after a workout session.

In one preferred embodiment of the present invention, the scheduling system receives a commitment from a member to a scheduled workout as well as a selection from the member for a Buddy from a "Buddy Pool." The system will notify the chosen Buddy of the scheduled workout as well as updating a calendar associated with the member. Then, during a range of time of when the scheduled workout is to occur, the system will detect the login for the scheduled workout. The system will determine if the login is within a predetermined time limit. If so, the system will show that the member worked out at the designated time.

In one preferred embodiment of the present invention, when a member is ready to workout, the member goes to the WOWY website and selects the member's program(s). The member may add an optional goal for that workout and see a "Tip of the Day" from the member's trainer/coach. When the member selects the "Ready, Set, GO!" button, the member will start a workout timer and, in one embodiment, be visible "in the gym" for the duration of the member's program. When the member is finished, the member goes to the chat room to chat with other members or Buddies, such as those who have just completed their workouts.

Features of the WOWY system include the following:
  Before a member starts a workout in the virtual gym, the system will allow the member to enter a goal and select the particular time that they will be engaged in the workout.
  The time of the workout may be predetermined if the member selects a particular class or program. For example, if the member selects a workout that is based on an exercise video the member will play at home, the system will set the workout time to the length of the video.
  Members can determine who else in their group is working out at the same time.
  Members can determine how many people are working out to the same workout program.
  When the member has completed the workout, the system will inform other members in the member's WOWY workout group that the member has worked out that day.
  Members will be able to track a fitness program using a progress-tracking system that includes a fitness diary and diet tracker.
  There is a reward program for completed workouts.

Although the invention is applied to implementing an online gym, it may also be applied to any online application where it is desirable to provide an online community that motivates members in a group while providing individual progress tracking (e.g., a substance abuse program).

Figure 2:
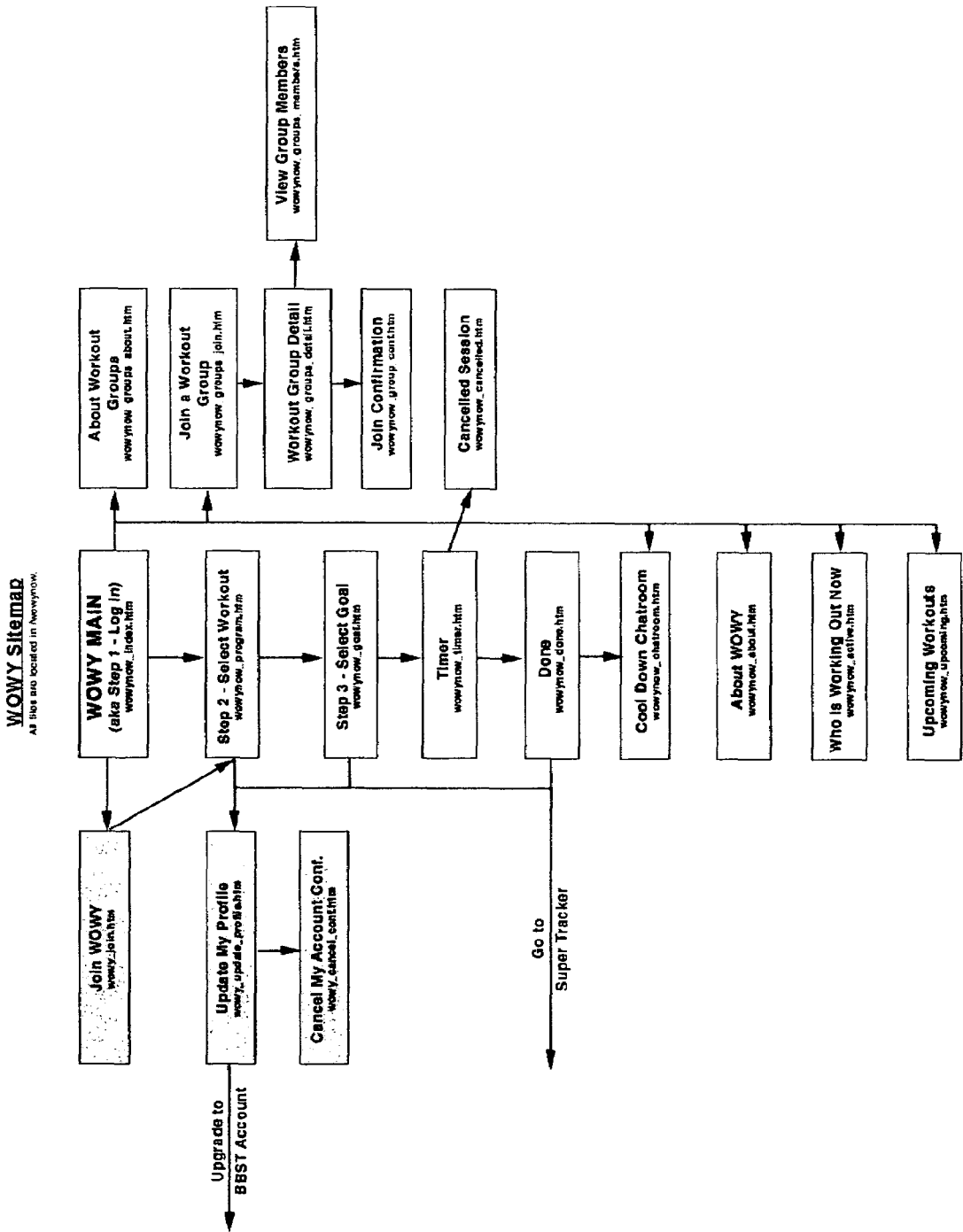
FIG. 2 is an overview of the structure of the virtual online gym configured in accordance to a preferred embodiment of the present invention.

FIG. 1 is flow diagram of the operation of the online gym in accordance with one embodiment of the present invention, and is described with reference to FIGS. 4-19. FIGS. 4-19 describes one embodiment of the member interface presented to the member during the use of the system. It should be noted that in various embodiments, the information requested or presented on each page may be displayed on different pages. Thus, the format and layout of the information presented in the examples is only one approach that may be followed. Further, FIG. 2 includes a site-map/functional block diagram of the website configured in accordance with one embodiment of the present invention.

In step 102, the member is prompted to login at a main entry screen. FIG. 3 illustrates one embodiment of the main entry screen where members first enter the WOWY system. The screen includes a login portion where a member may login with their username and password, or, if the individual is a guest, to simply choose a screen name without logging in. The screen also includes a list of upcoming group workouts as well as a summary listing of the number of members using the system. Further, the entry screen includes a link to the member's WOWY member page, links to retrieve information on members who are "WOWY NOW" (i.e., members who are on the system now) or "WOWY LATER" (i.e., members who have been on the system and will return later); links to the top workout programs or classes; a link to learn more about the system; a link to the WOWY groups; and a link to the "COOL DOWN CHAT ROOM" to where, as further described below, members are directed after they have completed their workout.

As discussed above, existing members may login to the WOWY system using their username and password. If the login is not recognized, then a message is displayed that informs the member of the error. At that point, the member can try to login again. The entrance screen also provides a link for the member to retrieve or reset their password if the member has forgotten it. The system will also ask if the individual trying to login is actually a member in case the individual who is trying to enter the system as a member has actually not registered as a regular member.

If an individual has not registered, they may still use the system as a guest member by choosing a screen name (username). Once the individual has supplied a username and password, the guest is taken to the WOWY member page immediately. Also, if the individual has not registered as a regular member and uses a guest screen name to enter the site, then the guest is directed to the workout selection page immediately after login as well. In this embodiment, the system does not track any activity/usage history of the system by the guest members. In another embodiment, the system may track some or all of the information related the guest member's access and the guest member may be provided with a limited range of functionality based on that tracking. Thus, for example, a guest member may be given a limited time to enroll and store their tracked information. For example, a guest member may be able to use the site 5 times before they have to register for a permanent username and password as a regular member. As another example, the guest member may use the site for a number of days or workouts before the system requires them to register. Other limitations based on the guest member's information may be applied. Unless otherwise noted herein, a guest member will have access to try out and use all the services to which a regular member has access. Thus, the references made below to "members" should apply to guest members as well.

An "UPCOMING GROUP WORKOUT" area lists the scheduled workouts by various groups, with a "JOIN THIS GROUP" link for the member to quickly join the listed group. A "VIEW ALL GROUPS" link allows the member to view all the groups in the WOWY system. Once a member has joined the group, a confirmation message is sent to the member. In another embodiment, the member will have a list of the joined groups displayed on the screens of the system as the member accesses the site.

The entry screen shows that there are 2,527 people working at this time, and a link that connects "right now" text to display the profile of the members who are working out. In one embodiment, members may opt to not show their profile. In another embodiment, a member may opt to hide their activity, including their online activity, such that no members other than members for whom the member has authorized may obtain any information regarding their activity. For example, a member may allow the members of the group(s) to which the member belong to determine if the member has worked out on a particular day.

In one embodiment, the entry screen includes a display of the profiles of a random sample of the 2,527 members that are currently working out. In the displayed example, 2 members are displayed. However, the number of members displayed is arbitrary and no member profiles need be displayed. The members that are chosen may be random or may be based on any criteria. For example, the system may display members based on the most recent active members. Guest members may be excluded from the random sample as well as the guest members typically have not provided any additional information about themselves.

FIG. 4 illustrates the WOWY member page for the member "bosnia" with a link to "WOWY NOW!" (i.e., access the WOWY workout system), or schedule a workout or join a workout group. The WOWY member page also includes links on the left side of the screen to the same functions, as well as a link to the member's "BBST" locker, which is a member information page to update their information on a related website entitled BeachBody.com. The member can also update their WOWY profile using the "UPDATE PROFILE" link, or logout of the system by using the "LOGOUT" link.

Figure 5:
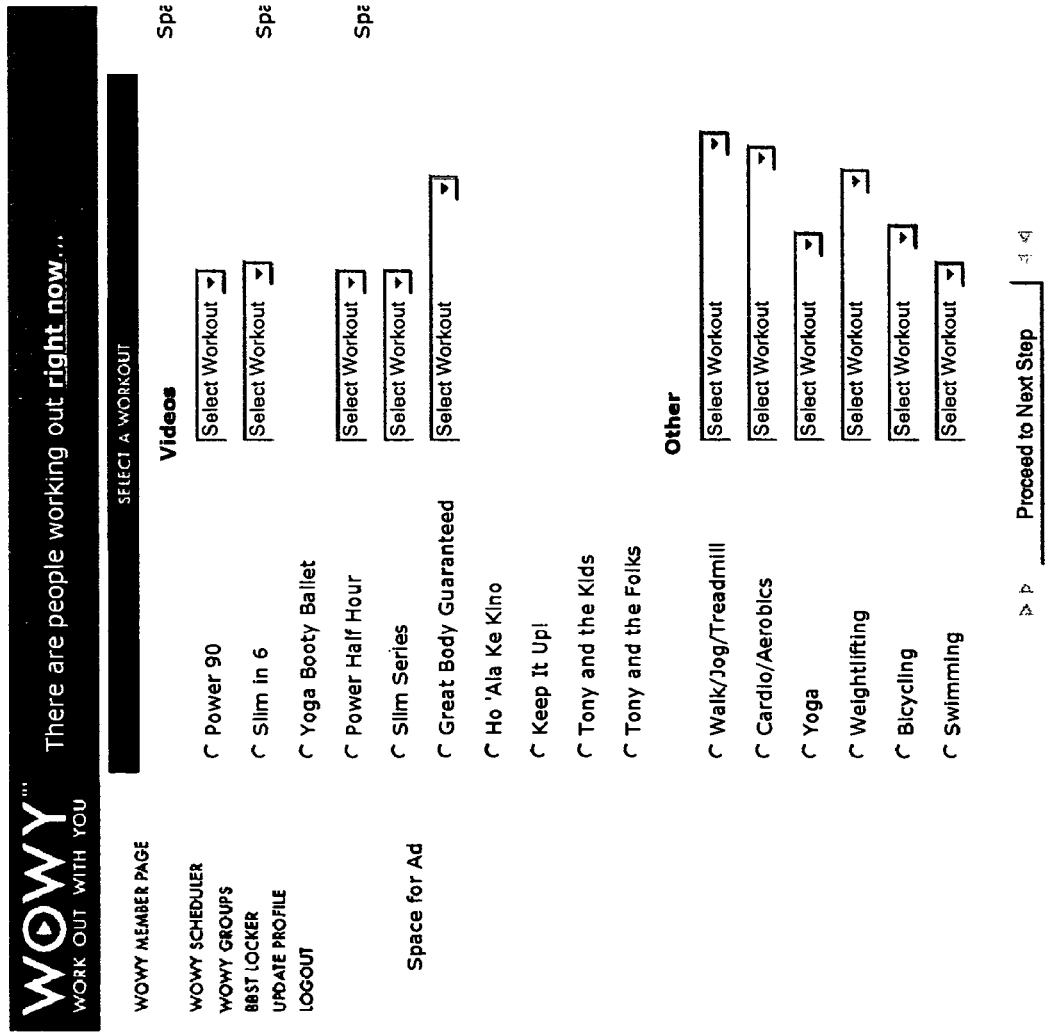

Referring back to step 104 in FIG. 1, when the member selects the "WOWY NOW!" link, the member will be taken to the workout selection screen shown in FIG. 5. The member may select from a list of predefined videos, which will result in the system being able to automatically look up the length of the workout based on a database or a stored list of workout programs, or the member may select from a list of other workout programs, each with a sub-listing of pre-determined exercise times. In another embodiment, the member may enter the exercise and/or the time the member wants to perform the exercise. The list of displayed exercise programs may be changed and customized based on the member's preference. For example, if the member has indicated that they are interested in programs related to losing weight, the programs listed may be geared towards that aspect.

As described, the member chose a workout based on the presented list of exercise programs. However, the presented list may be modified based on the exercise programs selected by the group. Thus, one or more programs may be available on the list, which may be dynamically changed based on a prescribed exercise regimen or a leader or coach of the group. Thus, for example, a "beginners" group may include a walking segment of the program for 2 weeks, then progress to a "jogging" segment for 4 weeks, culminating in a "weight training" segment for 4 more weeks. Thus all members of the group would perform the same program, albeit at different times of the day or even days of the week. Further, the coach may alter the exercise program based on the progression of the group. Further, in other embodiments, a required set of exercises as well as an optional set of exercises may be included.

Figure 6:
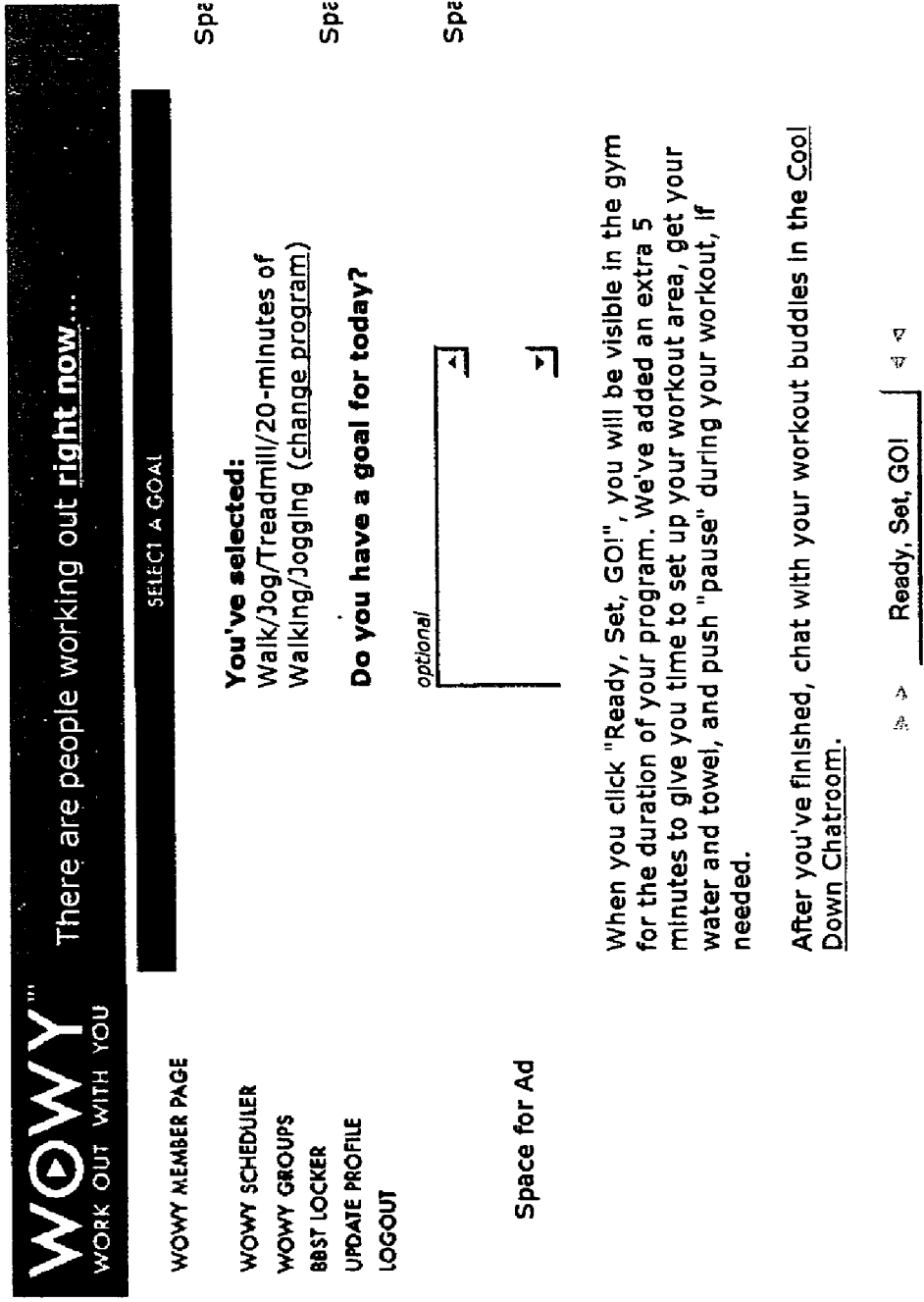

In step 106, after the member has chosen to select the "Walk/Jog/Treadmill" program with a time period of 20 minutes, the member is provided with a screen as shown in FIG. 6 to input an optional goal for the exercise. The member is allowed to change the selected program on this screen, as well as being provided information that the workout will begin in 5 minutes after they select the "Ready, Set, GO!" button. In another embodiment, no time is provided and the workout would commence immediately. In yet another embodiment, the member may input the number of minutes they wish to delay the start of the workout.

Once the member decides to start the program, the system displays the time left in the workout program in a timer, which includes any extra time the system added to delay the start of the program. As shown in step 108 of FIG. 1, the timer is checked to see if it has expired (i.e., whether the selected/ entered exercise time has been reached). In another embodiment, another aspect of the workout program may be tracked, such as the number of repetitions of an exercise or a particular number of laps a member has gone through.

The timer screen also lists the other members who are working out that are from the same group as the member. In another embodiment, the members who are shown are members who are performing the same workout program, whether or not they are not in the same workout group. In yet another embodiment, the members displayed include both members from both categories. Further, in one embodiment, the list of members is automatically updated based on members starting or completing their programs, or other interaction with the system. For example, in FIG. 7, member "yvonneh," who also belongs to the "Barbie's splits routine" workout group is listed as currently working out.

During the workout in the timer screen, the member can select "DONE" or "CANCEL" depending if the member completes the workout earlier than expected (e.g., the member used less time than was necessary to prepare to begin the workout), or decides to cancel the workout, respectively. Thus, operation will continue to step 112 of FIG. 1 if the member selects "DONE" or the timer completes the complete program time; or step 114 of FIG. 1 if the member cancels the workout in step 110 of FIG. 1. In addition, in step 112, the system updates the member's information with the completed program, the time spent (which may be the entire time if the timer expired by itself, or the amount of time from the start of the program to the time the member either selected "DONE" or "CANCEL").

Figure 8:
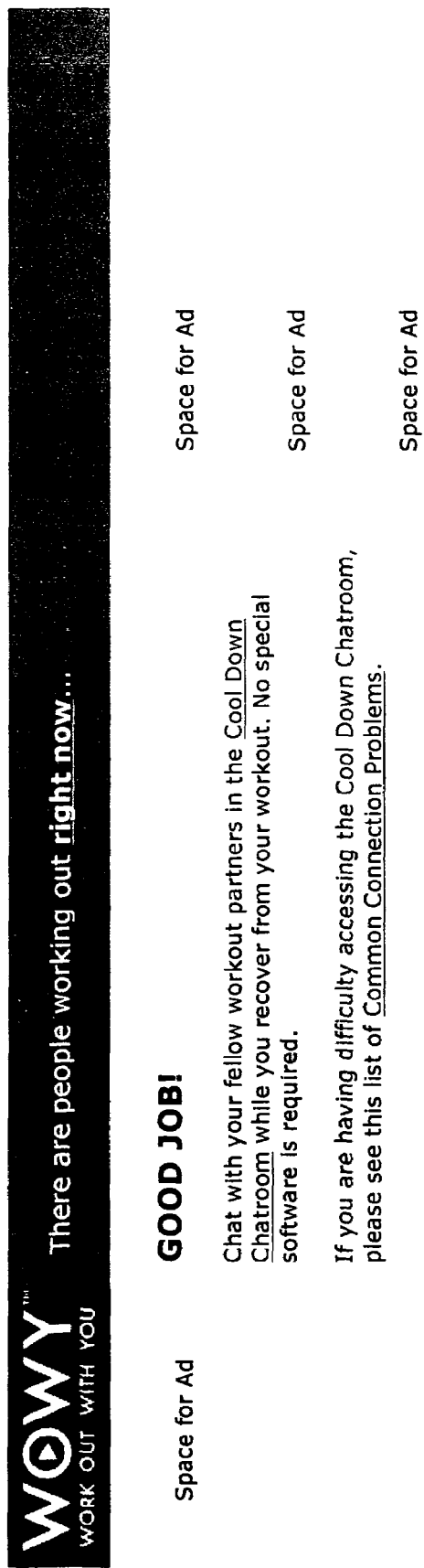
Figure 9:
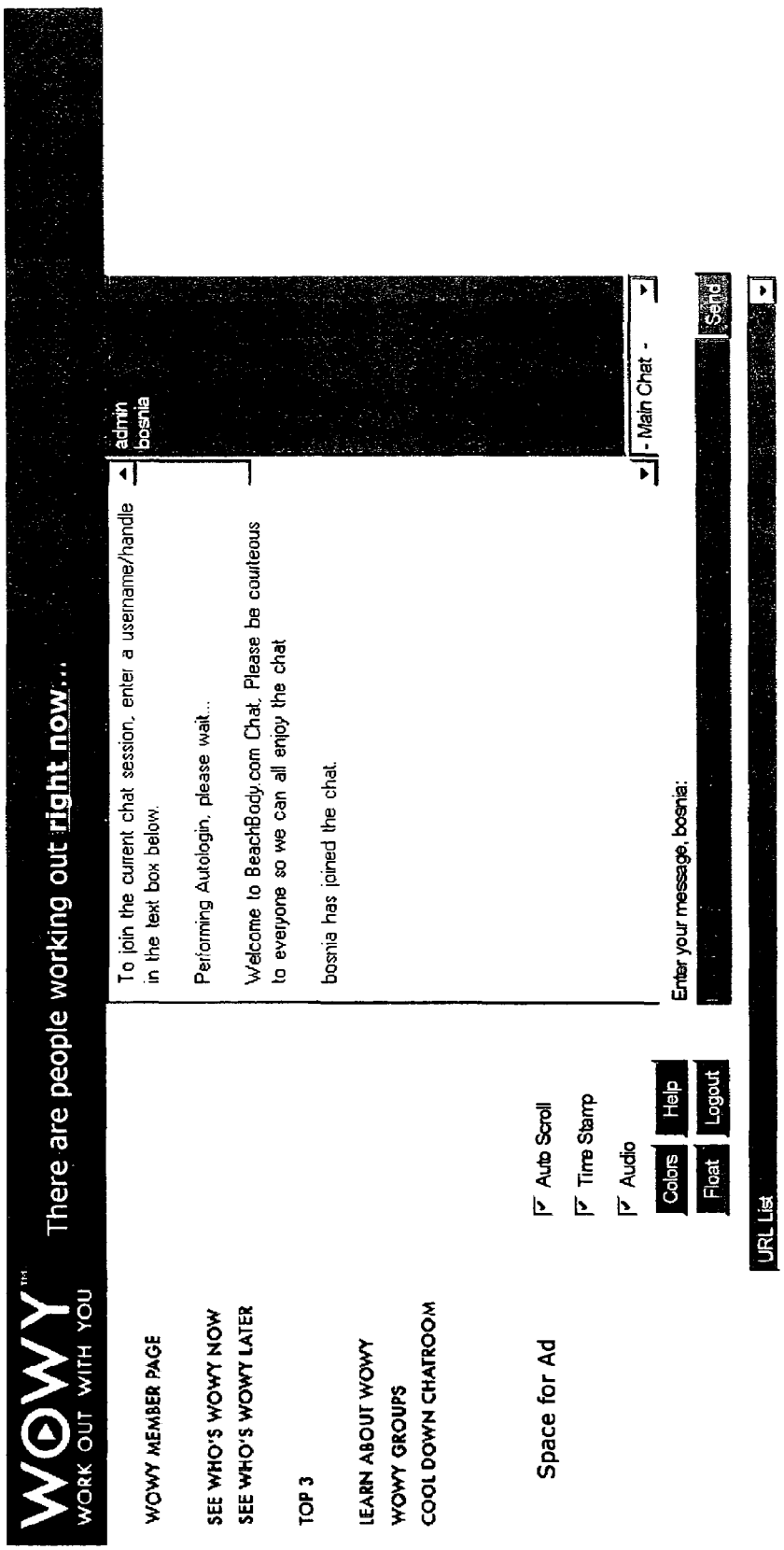

In FIG. 8, and step 116 of FIG. 1, the system displays a congratulatory message for the member completing the workout, and offers the member a link to the "COOL DOWN CHAT ROOM" so that the member can chat with other members about the workout. If the member selects to go to the chat room, the member will be directed to the screen in FIG. 9, where the member can chat with other members in the chat room, or send a direct message to one or more other members in the chat room. For example, the member "bosnia" can send a message to member "admin" by selecting the "admin" username and providing a message.

Figure 10:

Returning to FIG. 4, and now additionally referring to FIG. 10, when a member selects the "Join or Leave A Workout Group" link, the system displays a list of groups, with a link to view the members of the group, as well as a message that informs the member that if the member wants to create a new group, they can e-mail the administrator of the system to create the group. In another embodiment, members may create their own group and send invitations to other members. Once the member has selected a workout group to join, the member's profile is updated and the groups that the member has joined is displayed on the member's WOWY member page, as shown in FIG. 12.

Figure 11:
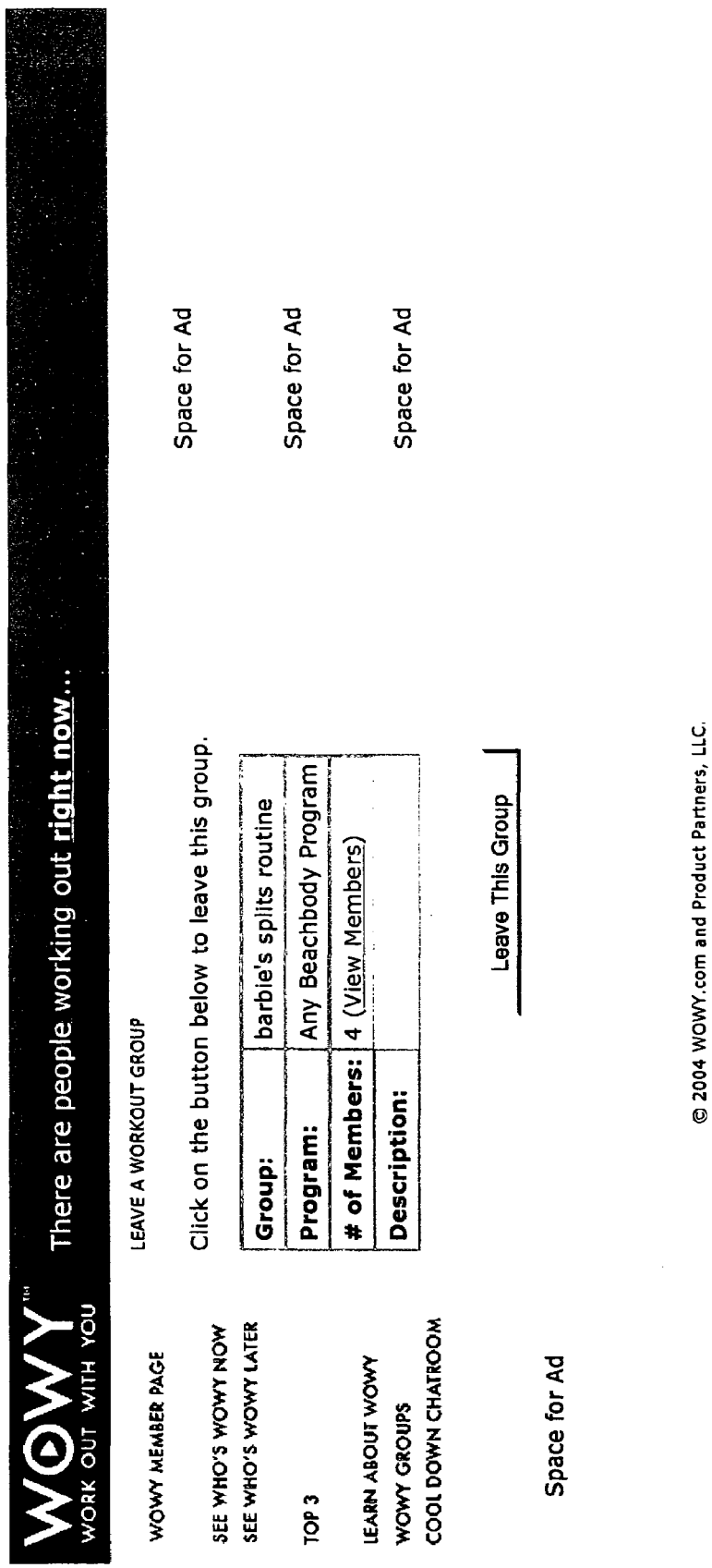

In FIG. 11, a member may leave a workout group by selecting the "LEAVE THIS GROUP" button. If the member is a member of more than one group, they can choose to leave one or more of their groups listed on the screen (not shown in the example of FIG. 11). The member can also display the profiles of the members of the group by selecting the "View Members" link.

Figure 12:
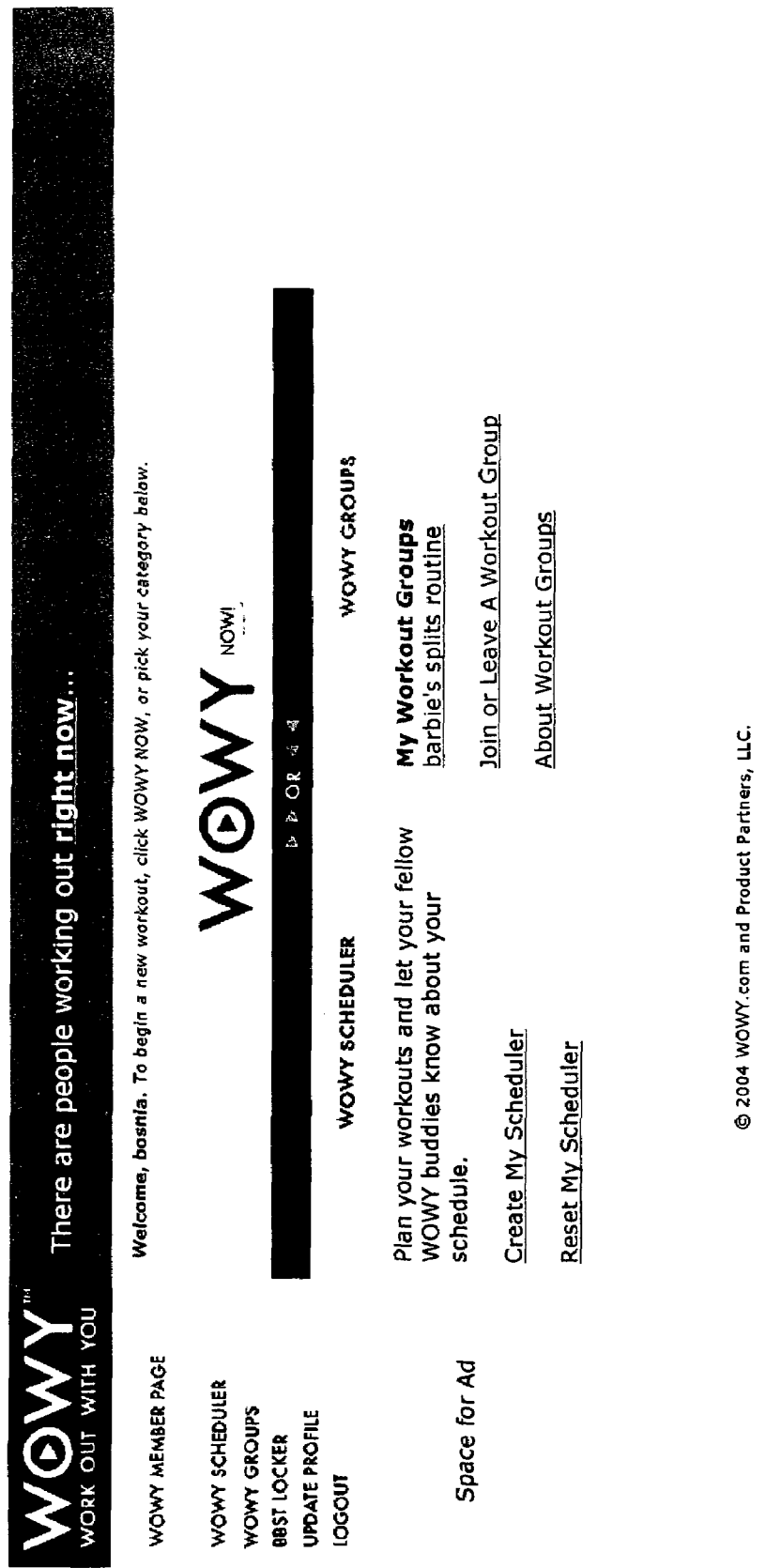

In FIG. 12, the member may choose the "Create My Scheduler" link to create a schedule that will track the member's workout and profile. The link takes the member to the screen as shown in FIG. 15, where the member can begin to start setting a schedule and the activities for the schedule. As discussed herein, the list of schedule may be modified based on the group(s) to which the member belongs or some other characteristic of the member. Once they submit the initial profile, the member is then allowed to set scheduled workouts in FIG. 16.

Figure 16:
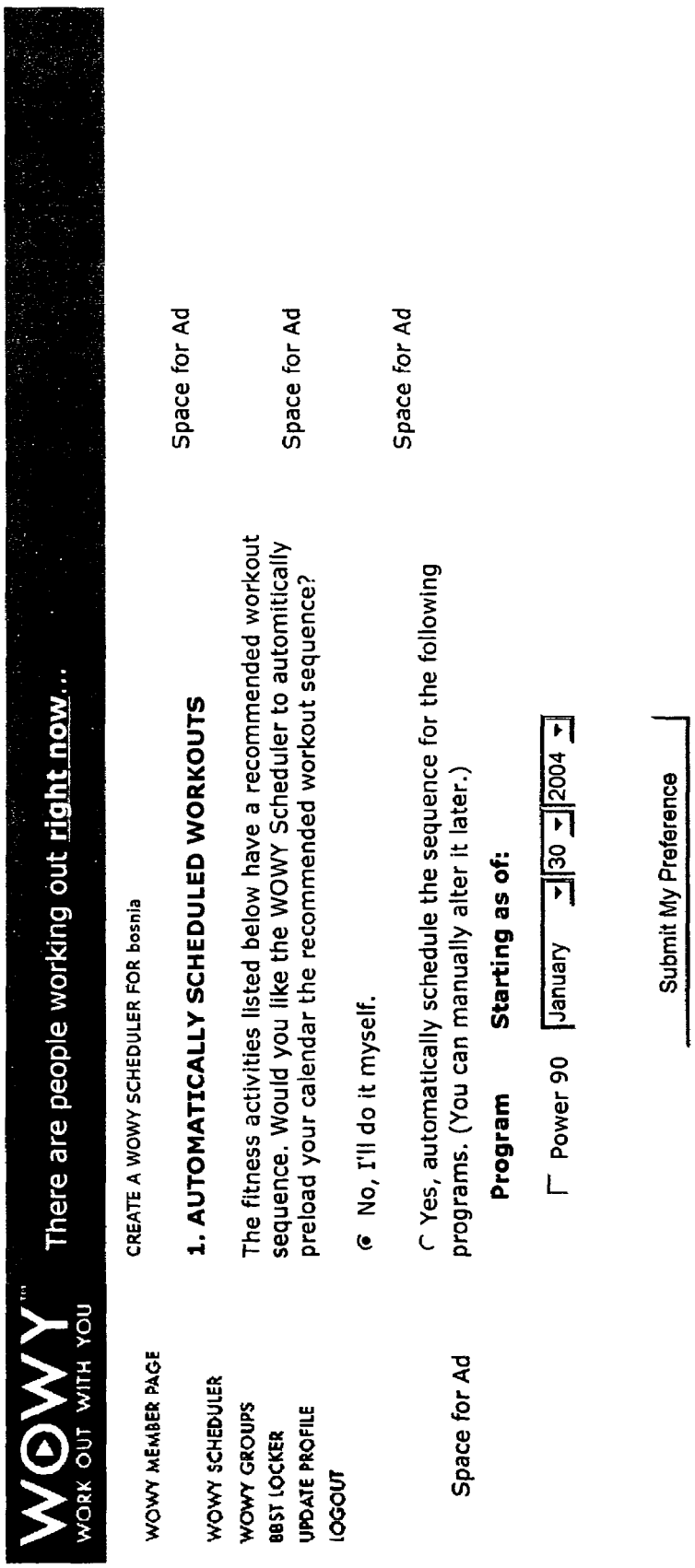
Figure 17:

In FIG. 16, the member may manually select the schedule of the workout, as seen in FIG. 17. The member may also let the system automatically schedule the sequence by selecting the program and starting date. In the example, only the "Power 90" program is selected. In another embodiment, the member may schedule their workouts based on a workout group, based on the schedule created by the coach or members of the workout group. In yet another embodiment, the member may also let the system randomly schedule the workout based on specific parameters and guidelines, such as goals that the member wishes to reach. In still yet another embodiment, the member may create a modified schedule based on an automatically created schedule.

In FIG. 17, the member can select the days on which the member will perform certain workouts, as well as indicate what time the workouts will take place. Further, the member may change the available workout programs by selecting the "Add New Activities." In FIG. 18, the member may change the list of selected activities/programs. As discussed, the displayed programs may be limited based on the groups to which the member belongs or some other criteria such as the member's fitness level.

Figure 13:

FIG. 13 illustrates the screen the member sees when the member selects the "LEARN ABOUT WOWY" page.

Figure 14:
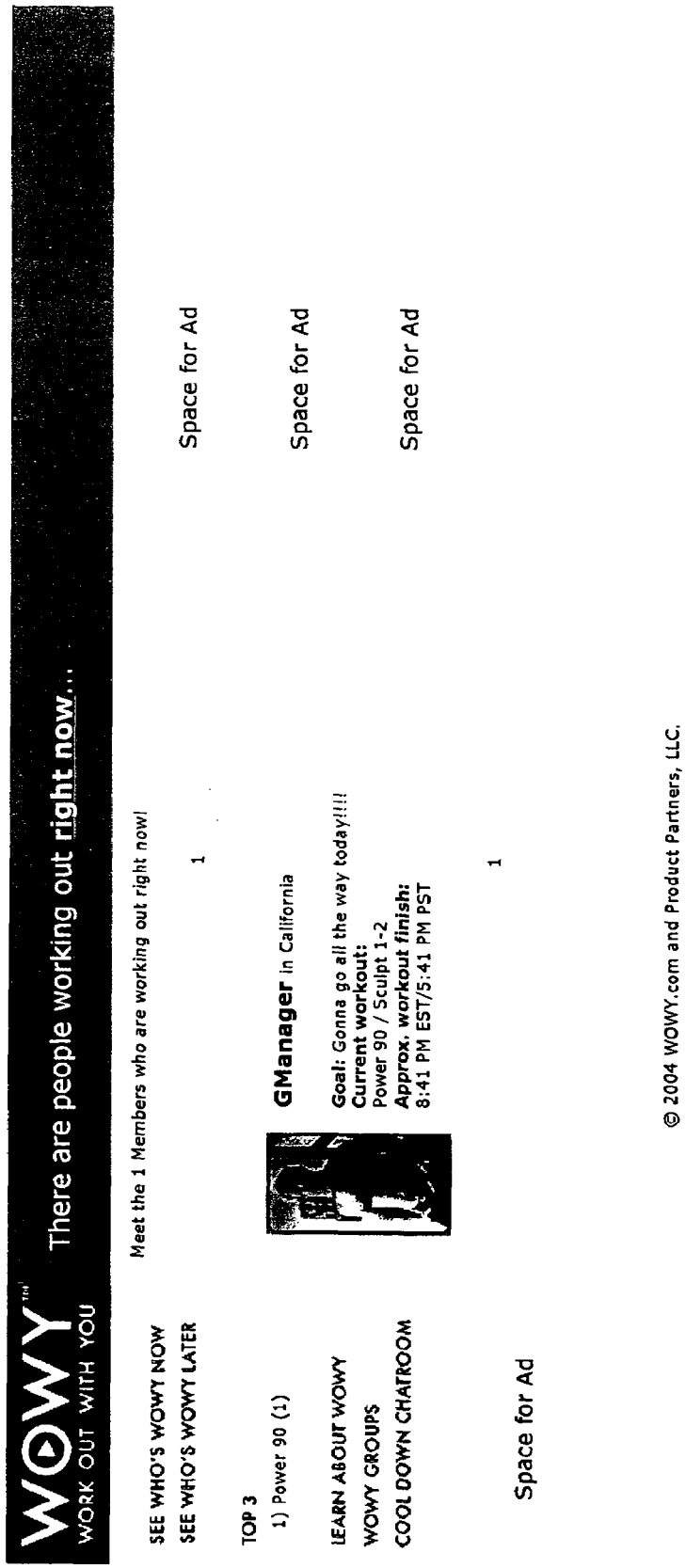

FIG. 14 is a figure illustrating the screen listing the members who are working out on the site currently. In one embodiment, only registered members (i.e., members with usernames and passwords) are listed. In another embodiment, members are listed whether or not they are members or guests. The listed members may also be sorted by group or one or more characteristics. As seen in FIG. 14, the listed members may include one or more pictures of the member. In addition, where the member chooses the listing of the members who are going to workout later by choosing the "SEE WHO'S WOWY LATER," a similar screen appears that lists the times that the members who will workout later will be shown. Search boxes (not shown) allow the member to search for specific members based on member name, groups and other criteria.

Figure 19:
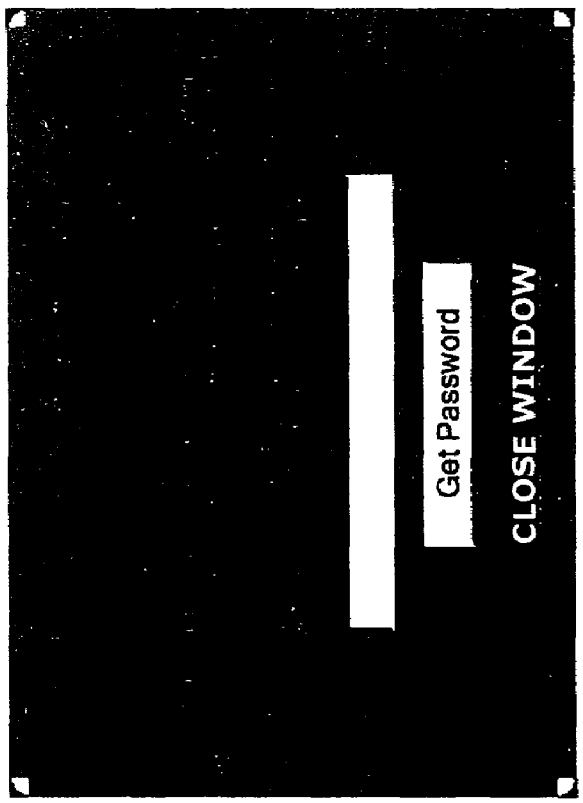

FIG. 19 is a figure illustrating the screen that a member will see when the member forgets his/her password. The system requests an e-mail address, and based on the provided e-mail address, will send an e-mail containing the password. In other embodiments, the system can reset the password and then send the new password to the member. In yet another embodiment, the system will send a web link to the member that will direct the member to a webpage where the member can perform member login/security functions.

The various embodiments of the invention described herein are further detailed in the documents entitled "WOWY Functional Spec" and "Super Tracker Functional Spec" as attached hereto in the Appendix. These documents and their associated figures are incorporated by reference in their entirety in this specification.

The embodiments described above are exemplary embodiments of the present invention. Those skilled in the art may now make numerous uses of, and departures from, the above-described embodiments without departing from the inventive concepts disclosed herein.

As described above, the present invention is directed to allowing an individual to increase his or her level of accountability by publicly committing to workout with others at a specific time, thus becoming a "Success Buddy." The group scheduling system, referred to as the "Success Buddy System," is another aspect of the WOWY system.

In addition to allowing the first member to be a Buddy to another member by the first member choosing that second member, two other members may select the first member as their "Success Buddy," creating a chain of members, or Buddies, who are expecting to see each other online and increasing the likelihood that all will attend in order not to disappoint each other.

A workout and diet scheduler/tracker calendar is implemented as part of the system, as further detailed below, to allow a member to mark off past workouts, schedule upcoming workouts, and request Success Buddies for individual workouts.

Figure 20:
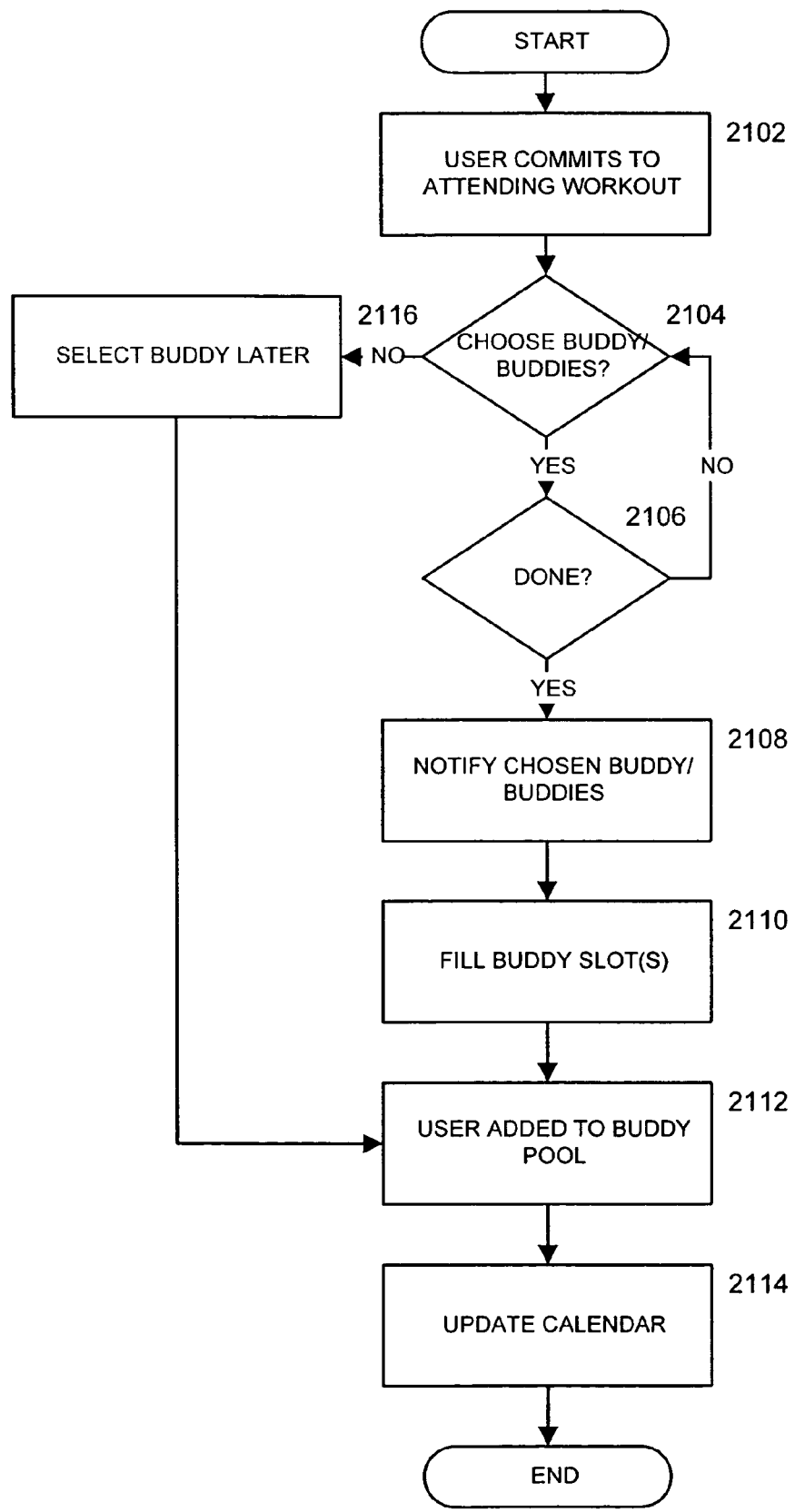
FIG. 20 is a flow diagram of the operation of the group scheduling system configured in accordance to a preferred embodiment of the present invention.
Figure 21:
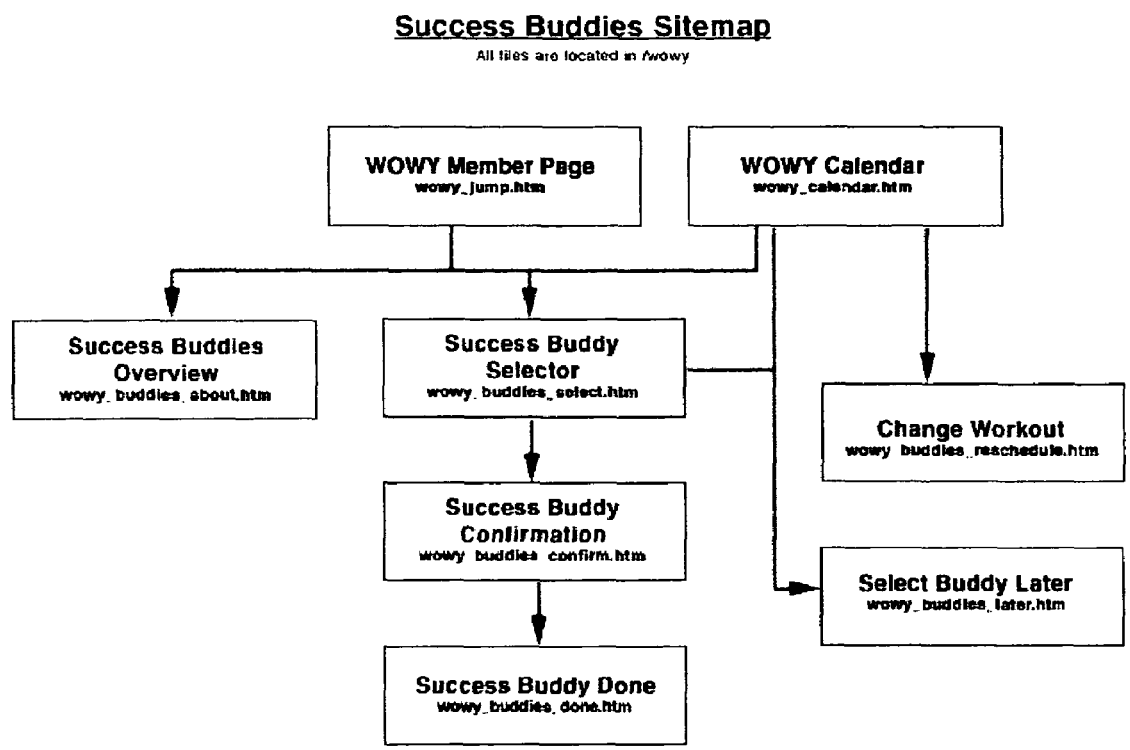
FIG. 21 is an overview of the website structure of the group scheduling system configured in accordance to a preferred embodiment of the present invention.

FIG. 20 is a flow diagram used to describe the operation of the various embodiments of the Success Buddy system, and is described with reference to FIG. 21, as well as, FIGS. 22-35. FIG. 21 includes a site-map/functional block diagram of the website configured in accordance with one embodiment of the present invention. FIGS. 22-35 describe one embodiment of the user interfaces presented to the member during the use of the system, such as through a web browser such as the Internet Explorer client program from Microsoft Corp. It should be noted that in various embodiments, the information requested or presented on each page may be displayed on different pages. Further, the graphical user interface (GUI) of the browser window surrounding the web page is not shown to reduce the amount of redundant information.

Figure 22A:
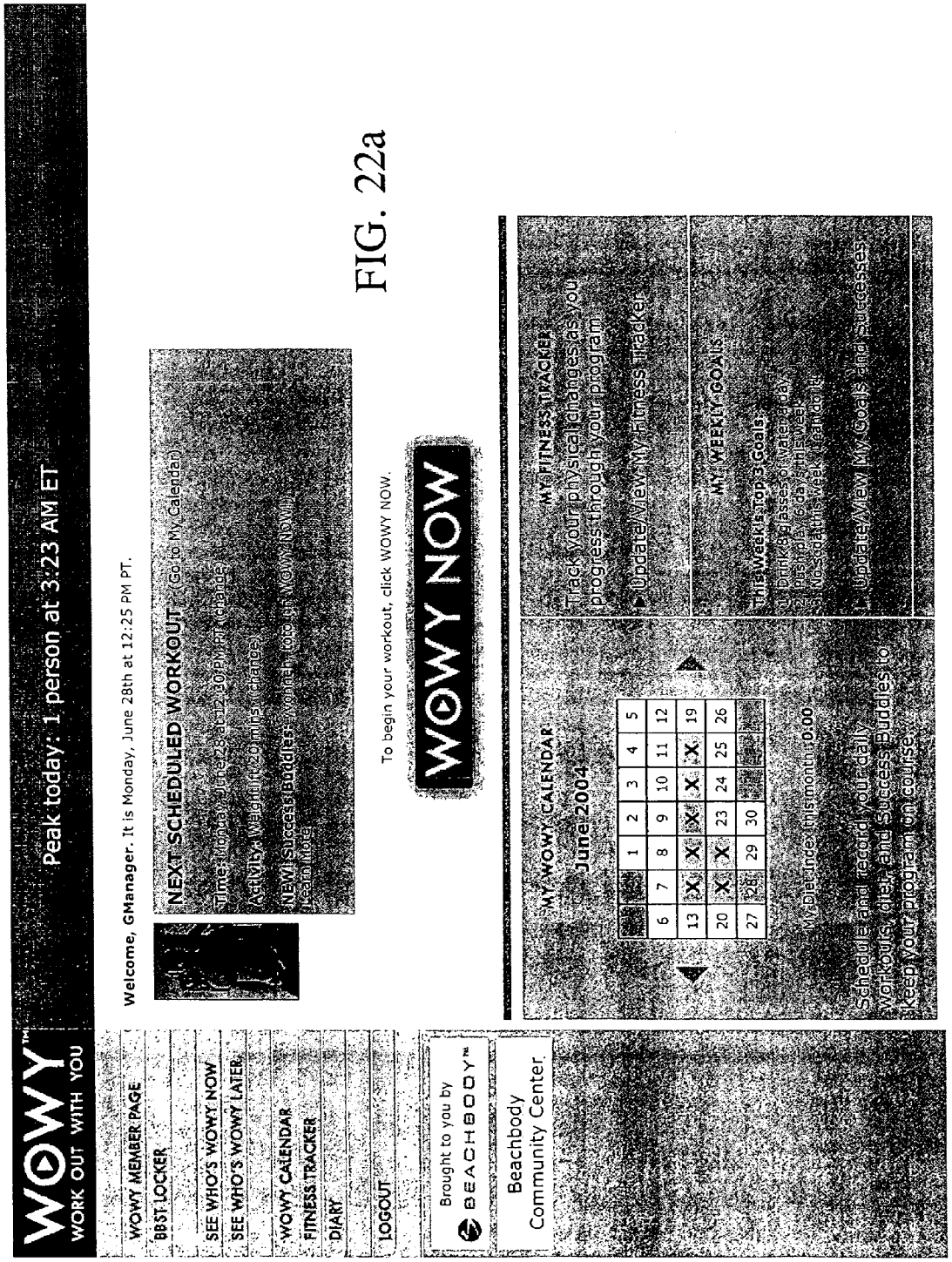
Figure 22B:
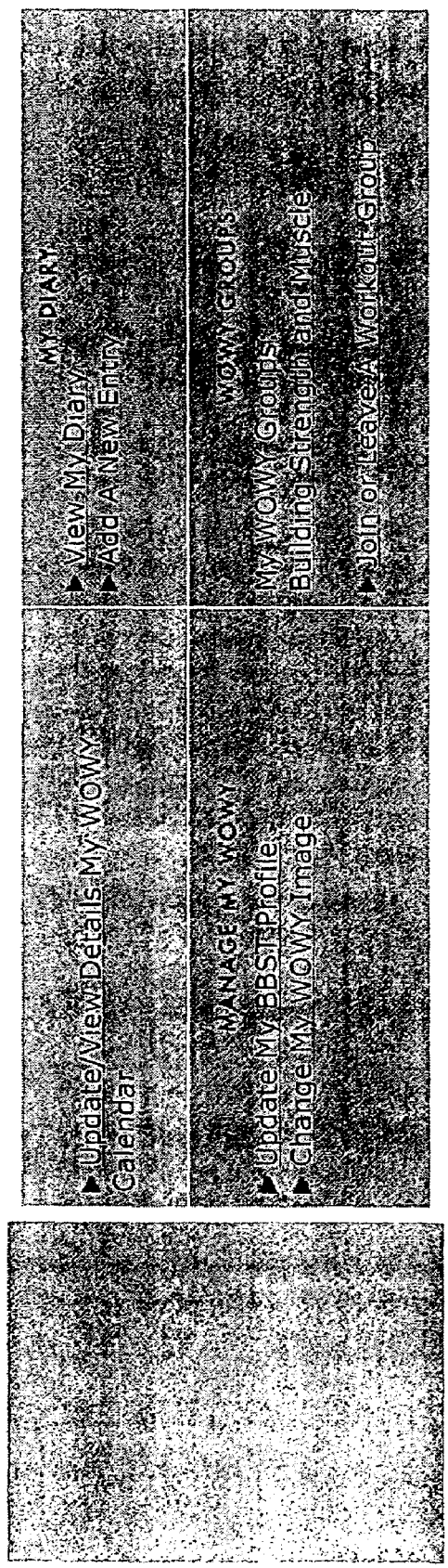
Figure 23A:
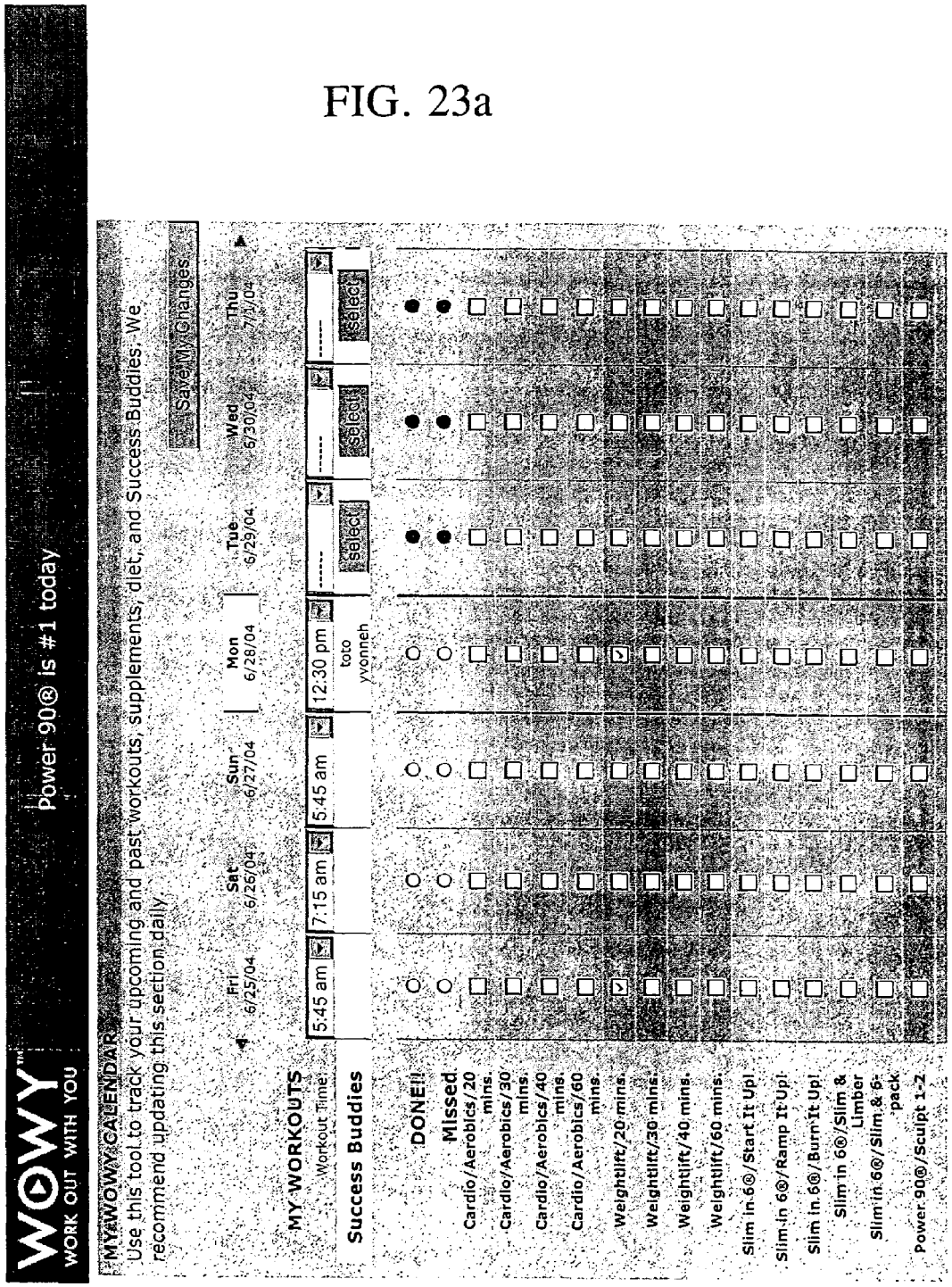
Figure 23B:
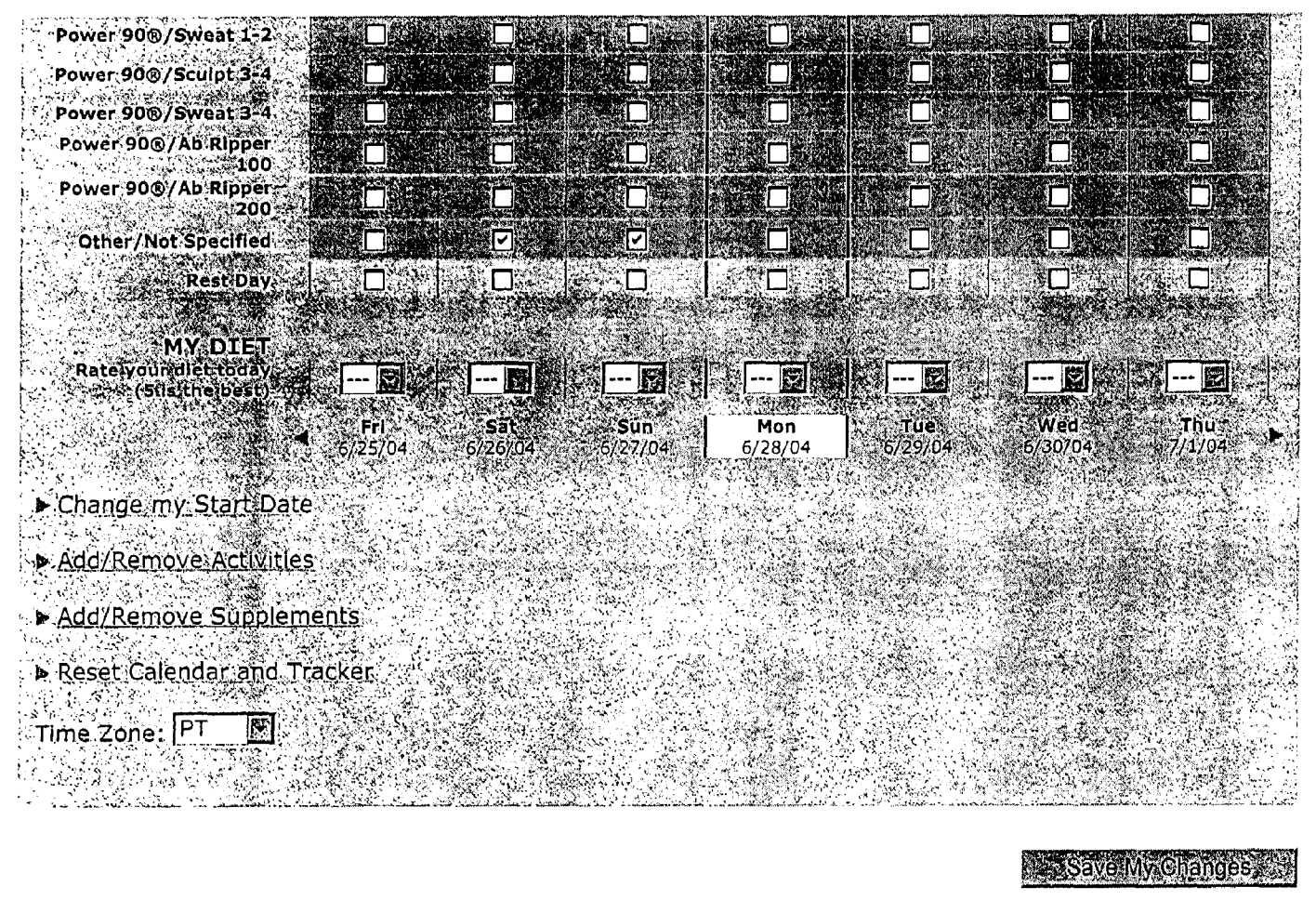

In step 2102, a member becomes a Success Buddy by committing to attend one specific workout. Members must commit to each workout individually and select/receive different Success Buddies for each one. For example, FIG. 22a-b illustrate the WOWY Member (wowy_jump.htm) page where a member, "Gmanager," has already committed to a workout of 20 minutes of weightlifting ("Weightlifting/20 mins.") (FIG. 22a-b will be further described below). To schedule a workout, a member accesses a WOWY Calendar (wowy_calendar.htm) page as shown in FIG. 23a-b. As seen in FIG. 23a, the "Weightlift/20 mins." option has been selected by member Gmanager and he is prompted to select Success Buddies.

Figure 24:
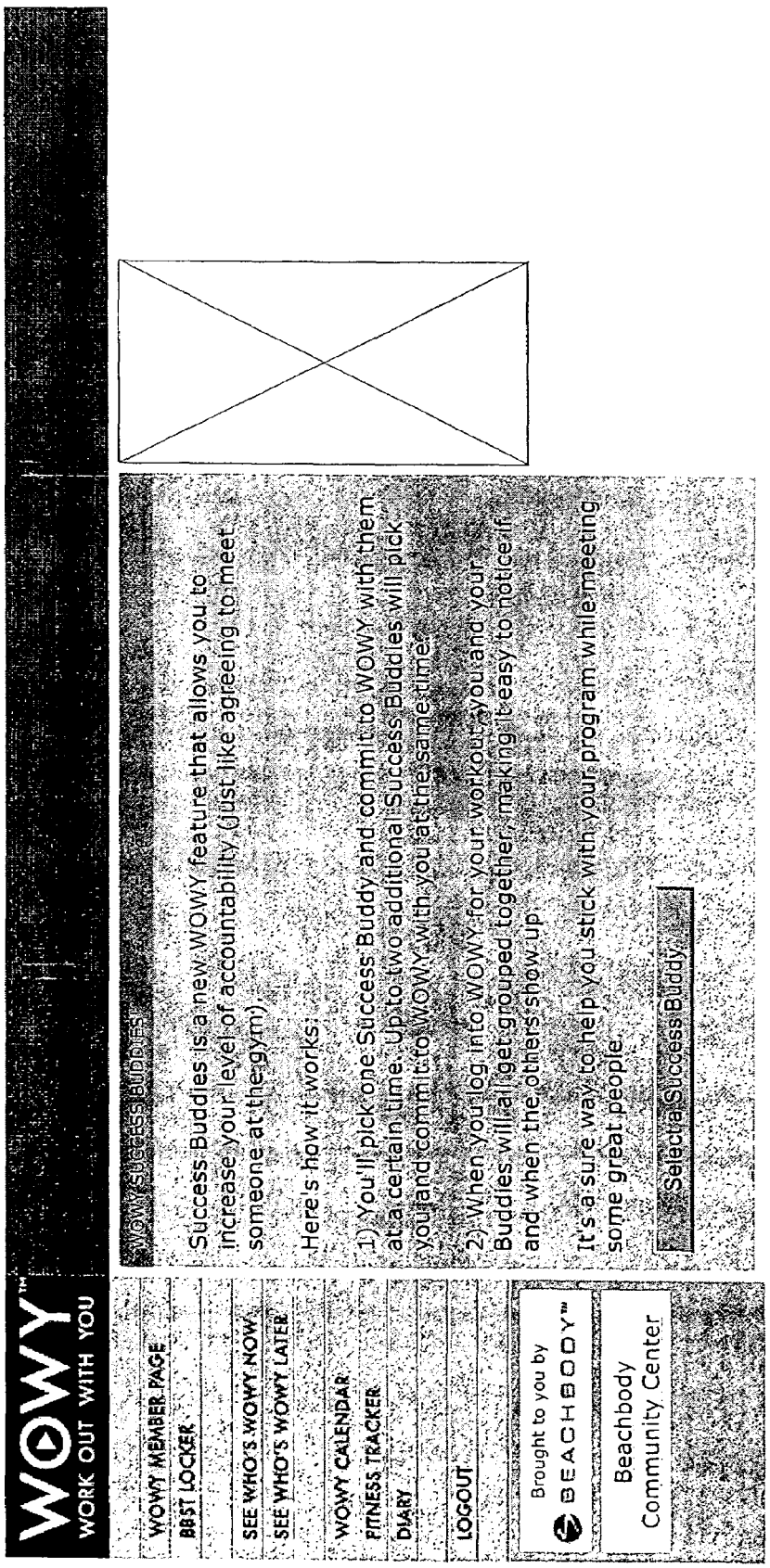

In one embodiment, if this is the first time a member is using the Buddy system, the member is first directed to a Success Buddies Overview (wowy_buddies_about.htm) page, as shown in FIG. 24, that explains how the Success Buddies system works. Thus, in this embodiment, after the member has visited this page once, the system does not have to present the member with this page again. In another embodiment, the member is always taken to this page once the member commits to a workout. However, it should be noted that this page may be accessible from other pages on the website, so the content presented to the member will vary based on specific conditions, as described below. The following description assumes that the member has opted to use the Buddies System.

The Success Buddies Overview page provides the member with a quick overview of the purpose and process of setting up Success Buddies. A button, which can be one of the following, is displayed on the Success Buddies Overview page:

1) "Select a Success Buddy" if the member has a workout scheduled. The link goes to the Success Buddy Selector page, which is described below.

2) "Schedule a Workout" if the member has a calendar set up, but no upcoming workout scheduled. The link goes to the member's WOWY Calendar.

3) "Create My Calendar" if the member does not have a Calendar. The link goes to the WOWY Calendar page.

In another embodiment, an additional "Not right now" button or link may allow the member to go back to the page from where the member came (e.g., either to the WOWY Member Page or the Calendar).

Thus, links to obtain a Success Buddy are available on both the WOWY Member Page and the WOWY Calendar (if a member has set one up). In another embodiments, each link may also be associated with a specific workout.

Once the member has committed to the Buddy System, operation continues with step 2104.

Figure 25A:
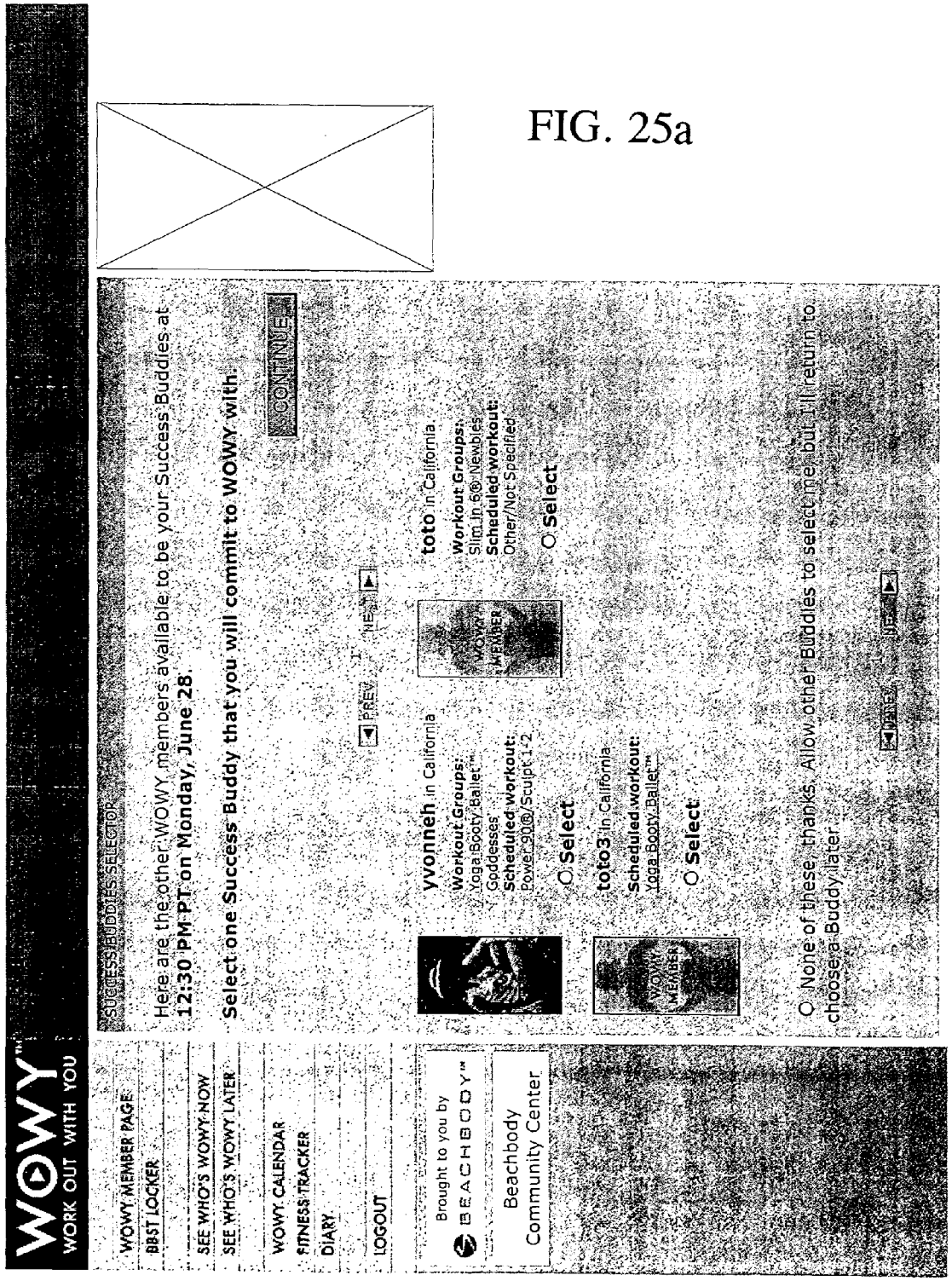
Figure 25B:
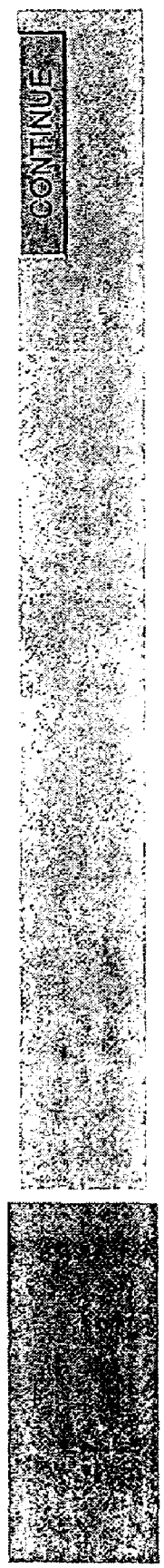

In step 2104, member Gmanager selects a Success Buddy after being presented with a Success Buddy Selector (wowy_buddies_select.htm) page, as shown in FIG. 25. In one embodiment, a participating member has three Buddy slots available per workout and one slot will be filled by a Buddy of the member's choosing. The other two slots may be filled by other members who selects the member. The portion of the Success Buddy Selector page where the member can select a Buddy is referred to as the Buddy Pool, which shows the member everyone who has scheduled a workout at the same day and time and has also requested a Success Buddy. The member can select one Buddy from the Buddy Pool. For example, referring back to FIG. 25a, member Gmanager can select "yvonneh," "toto," or "toto3" as his chosen Success Buddy.

In another embodiment, a member may select multiple Buddies, each filling a respective slot. In yet another embodiment, the system automatically fills the Buddy slots so the member does not have to select any Buddies. The selection may be completely random or based on a set of criteria that the member has previously provided, such as the members between a particular age range, a particular sex, in a particular type of program or WOWY group, etc. The system may also choose the buddies based on the profile of the member, including the routine that the member is using, the level of the member, etc. Other embodiments where fewer or more buddies are in a group are contemplated to be within the invention.

The Success Buddy Selector page allows the member to select one Buddy to fill the first Buddy slot (slot #1) for the associated workout. The opening paragraph reiterates their workout time in their preferred time zone. The content is slightly different depending on how many people are in the pool. It should be noted that the member Gmanager is not a part of the pool at this point yet. He will be added on a later page when he has confirmed his Buddy choice.

In one embodiment, a table is used to display the available Buddies in the Buddy Pool. Each cell of the table includes a bio box for a particular Buddy that displays a photo/icon, the Buddy's scheduled workout, and a select button, which allows the member to select the Buddy. The Buddies in the Buddy Pool may be sorted, with the sort order matching the order the Buddies entered the Buddy Pool, with the oldest in the top left position. The Buddy Pool excludes:

1) those whose slots #2 and #3 have been filled (i.e., already selected twice);
2) anyone who has already selected the member as a Buddy; and,
3) the member themselves.

It should be noted that the conditions for "2" and "3" will only exist if the member has returned to the Success Buddy Selector page because the member either was not originally able to select a Buddy or their original Buddy changed workout times.

In one embodiment, in addition to the table displayed as above, the Success Buddy Selector page also includes a radio button along with the following text:

None of the above. Allow other Buddies to select me, but I'll choose a Buddy later.

This last radio button allows the member to not immediately choose a Buddy.

A "Continue" button submits the member's choice and takes them to either a Buddy Confirmation page, as described in step 2106, if the member selected a Buddy, or to a Select Buddy Later page, as described in step 2116, if the member didn't select a Buddy.

Figure 26:
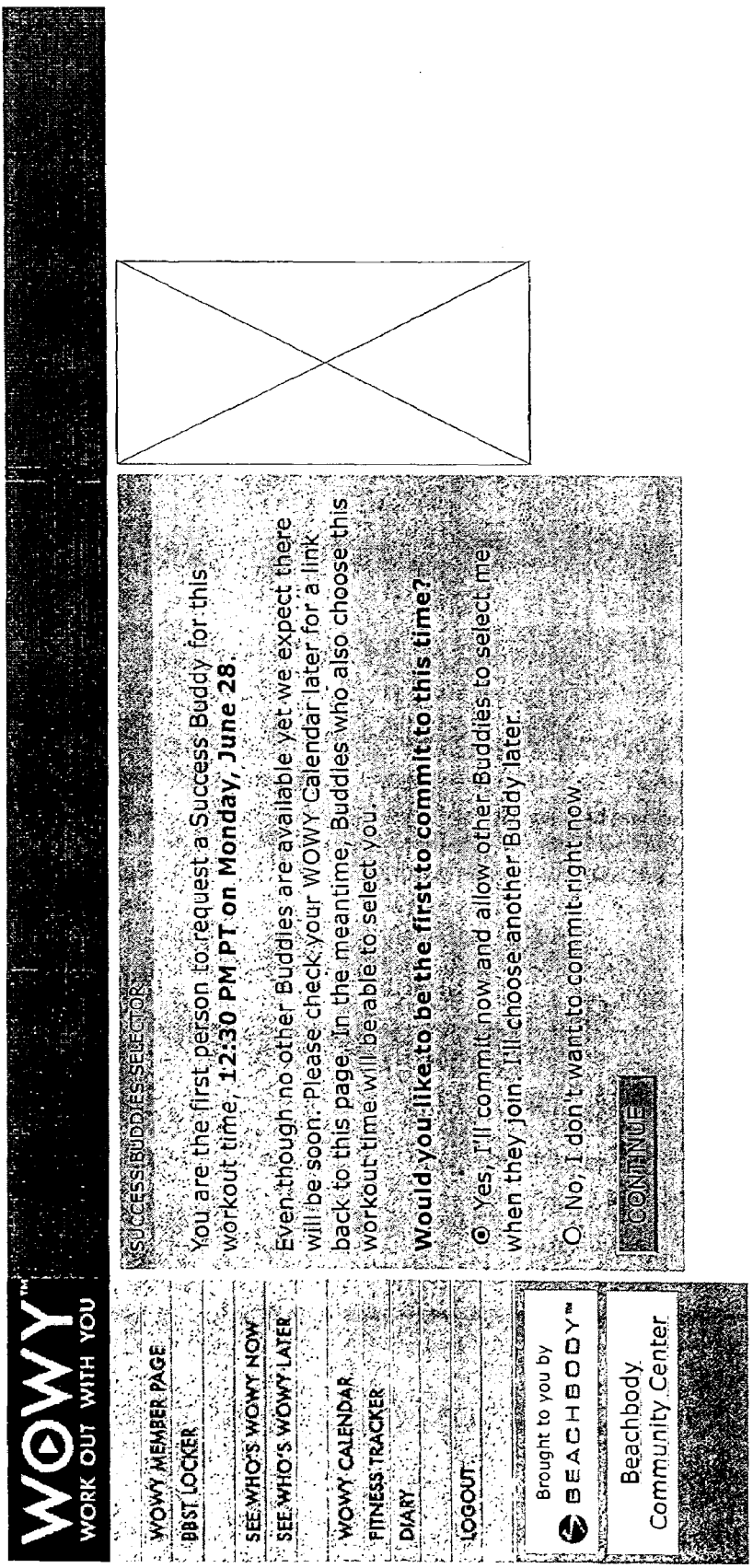

It may be possible that there are no Buddies in the Buddy Pool for the selected workout time. This is shown in FIG. 26, where if the member is the first person to enter the Buddy Pool, the following text is displayed:

You are the first person to request a Success Buddy for this workout time, [date/time]. Even though no other Buddies are available yet we expect there will be soon. Please check your WOWY Calendar later for a link back to this page. In the meantime, Buddies who also choose this workout time will be able to select you.

Below the paragraph are two radio buttons with the following text:

(1) Yes, I'll commit now and allow other Buddies to select me when they join. I'll choose another Buddy later.

(2) No, I don't want to commit right now.

The default option, option 1, is "Yes." A "Continue" button submits the member's choice.

The member is directed to the Select Buddy Later page, as described in step 2116, below, if they selected "Yes." Otherwise, the member is directed back to the member's WOWY Calendar page or WOWY Member page, if the member selected "No".

Members may be routed back to this page for various reasons, described further in this document. In those cases, the opening paragraph will display different text. For example, where the Buddy is unavailable, the following "Buddy Unavailable" text will be displayed:

Unfortunately, the Success Buddy you selected is no longer available. Please select a different Buddy that you will commit to WOWY with on [date/time].

In another example, where the Buddy has changed his/her workout text:

The Success Buddy you previously selected has changed their workout time. Please select another Success Buddy that you will commit to WOWY with on [date/time].

Once the member selects a Buddy, operation continues with step 2106.

Figure 27:
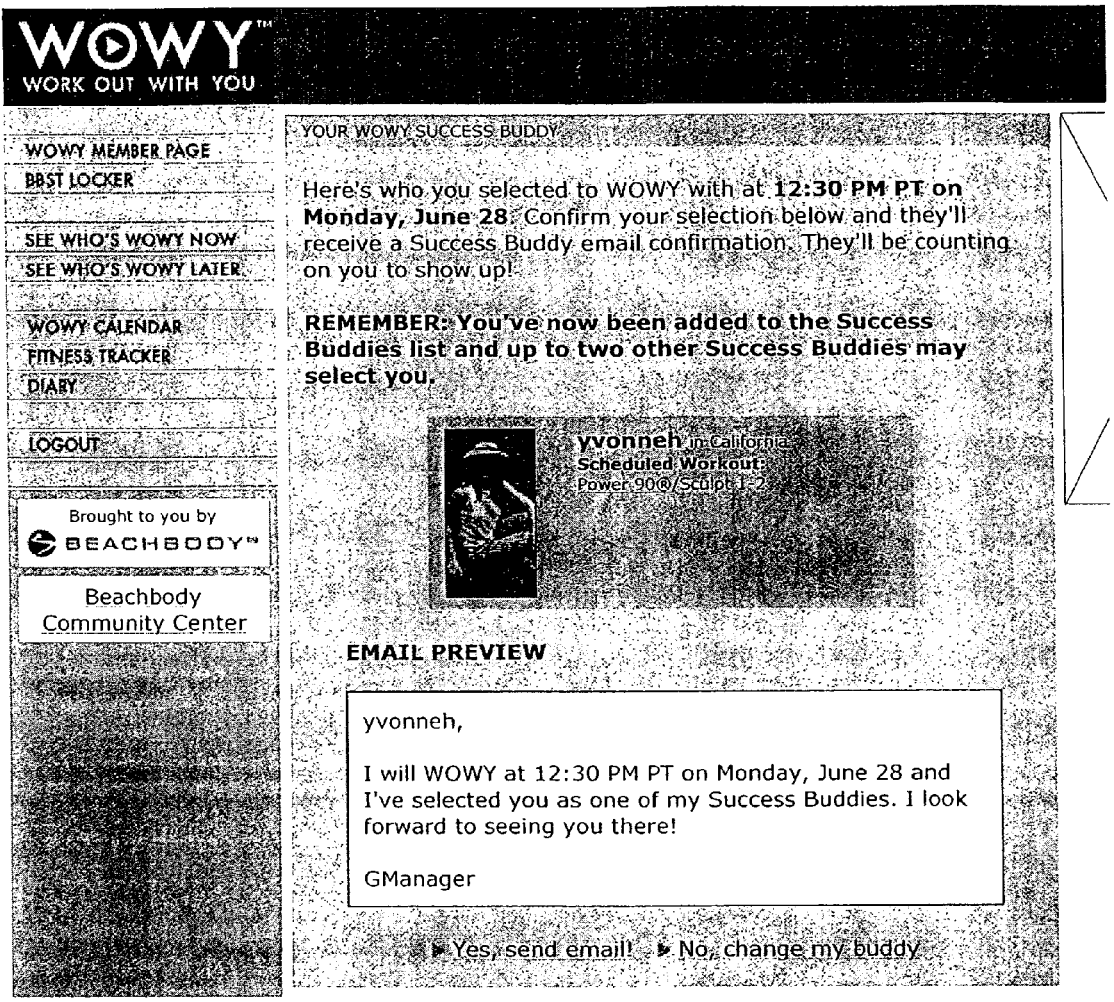

In step 2106, member Gmanager's Buddy choice is confirmed. Specifically, the system requests confirmation of the member Gmanager's choice by presenting the member with a Success Buddy Confirmation (wowy_buddies_confirm.htm) page, as shown in FIG. 27. The workout time and selected Buddy are reiterated on this page. The member is also presented with a copy of the email that will be sent to the chosen Buddy, if the member confirms the choice. However, if the member clicks the "Change my Buddy" link, indicating that the member does not wish to confirm the chosen Buddy, operation will return to step 2104, where the member is returned to the Buddy Selector page. In addition, even where the member accepts the displayed Buddy, the system re-checks the availability of the Buddy as it is possible that during the time from where the member originally selected the Buddy and the time the member confirmed, another member has taken that Buddy's final slot. If that is detected, operation will also return to step 2104, where the member is presented with the Success Buddy Selector page along with the "Unavailable Buddy" text as discussed in association with step 2104.

In step 2108, where the Buddy confirmation is successful, the chosen Buddy is sent an email to the Buddy's primary account. An exemplary outgoing email is as follows:

To:
(primary address of Buddy)
From:
SuccessBuddies@wowy.com
Subject:
WOWY Success Buddy for Tuesday, May 12 at 8:30 AM ET [in Buddy's preferred zone]
Body:
[Buddy username],
I will be WOWY at [time/date—Buddy's time zone] and I've selected you as one of my Success Buddies. I look forward to seeing you there!
[myusername]
--------------------------------------------------------
You have received this email because you requested a Success Buddy at www.wowy.com for your workout on [date/time]. Please do not reply to this email.

Although the preferred notification system is via email, in other embodiments the chosen Buddy may also be notified by an Short Messaging System (SMS) message, an alphanumeric page, a voicemail, or other means of notification. Once the chosen Buddy has been notified, operation then proceeds with step 2110.

In step 2110, the member's first slot is filled by this Buddy. In one embodiment, the system updates the member's record to reflect slot #1 is filled by a chosen Buddy.

In step 2112, member Gmanager is added to the Success Buddy pool, so his two remaining slots may be filled by the two other members who select him.

Figure 28:
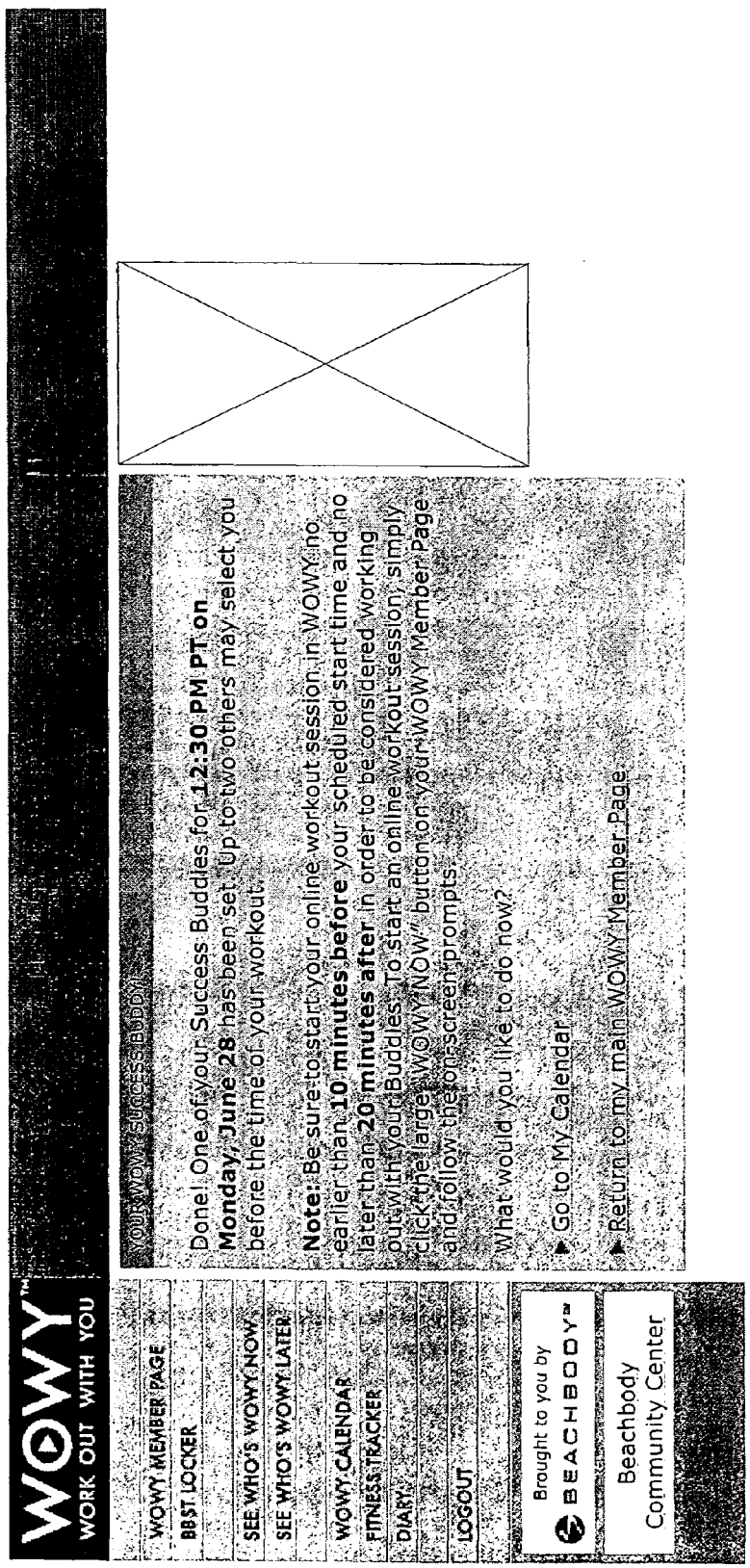

In step 2114, the member's WOWY calendar is updated and the member is presented with the Buddies Done (wowy_buddies_done.htm) page, as shown in FIG. 28. The Buddies Done page notifies the member that their Success Buddy is set for that workout and reminds the member that two other members may select the member as a Buddy. The page includes links back to the member's WOWY Calendar page and WOWY Member page.

Figure 29:
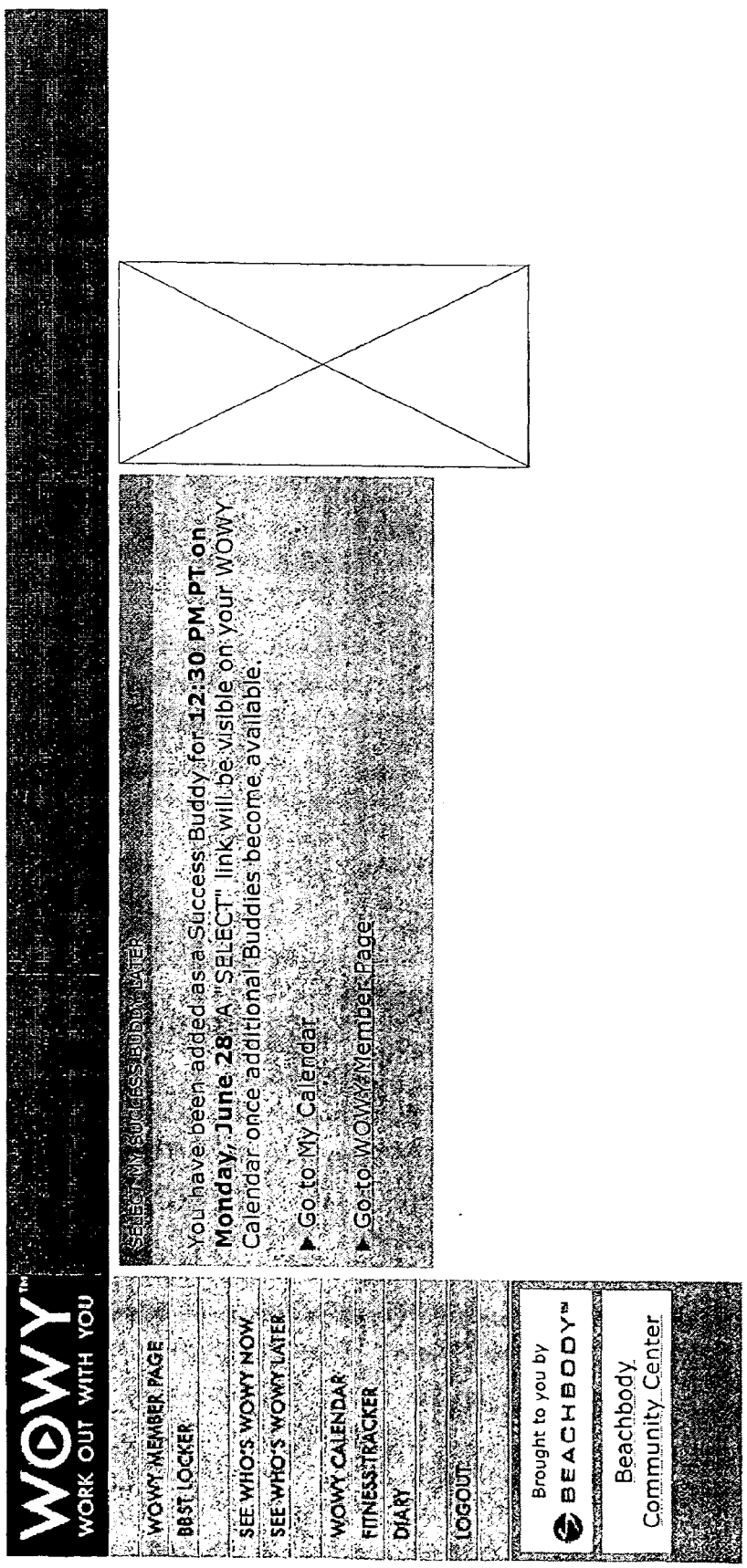

In step 2116, there are no Buddies to select or there are less than 4 Buddies available and the member has opted to choose one later. A Select Buddy Later (wowy_buddies_later.htin) page, as shown in FIG. 29, is presented to the member and contains text to inform the member that the member has been added to the pool and instructs them to check their Calendar later and use the link to select a Buddy. The page includes links back to the member's Calendar and WOWY Member Page. Operation then continues with step 2112, where the member is added to the Buddy pool.

Further details for the pages described above, as well as for other pages not described above are provided as follows.

As discussed above, the WOWY Calendar combines a diet and workout scheduler and tracker in one single page. In one embodiment, a member can perform such functions as setting workouts, marking workouts as Done/Missed, and rating the member's diet on this page. Further, other information such as Buddies are listed on the member's WOWY Calendar, as well as on their WOWY Member Page on the day of their workout. As shown in FIG. 23a, the WOWY Calendar page includes:

1) a row for the Workout Time pull-down menus below "My Workouts;"

2) the current date in the center column, so that a member can see today, plus 3 days back and 3 days forward. A red border highlights the current date. In other embodiments, fewer or greater days may be displayed;

3) the background of cell with current date is white to make it stand out; and, 4) a Success Buddies row.

Figure 30A:
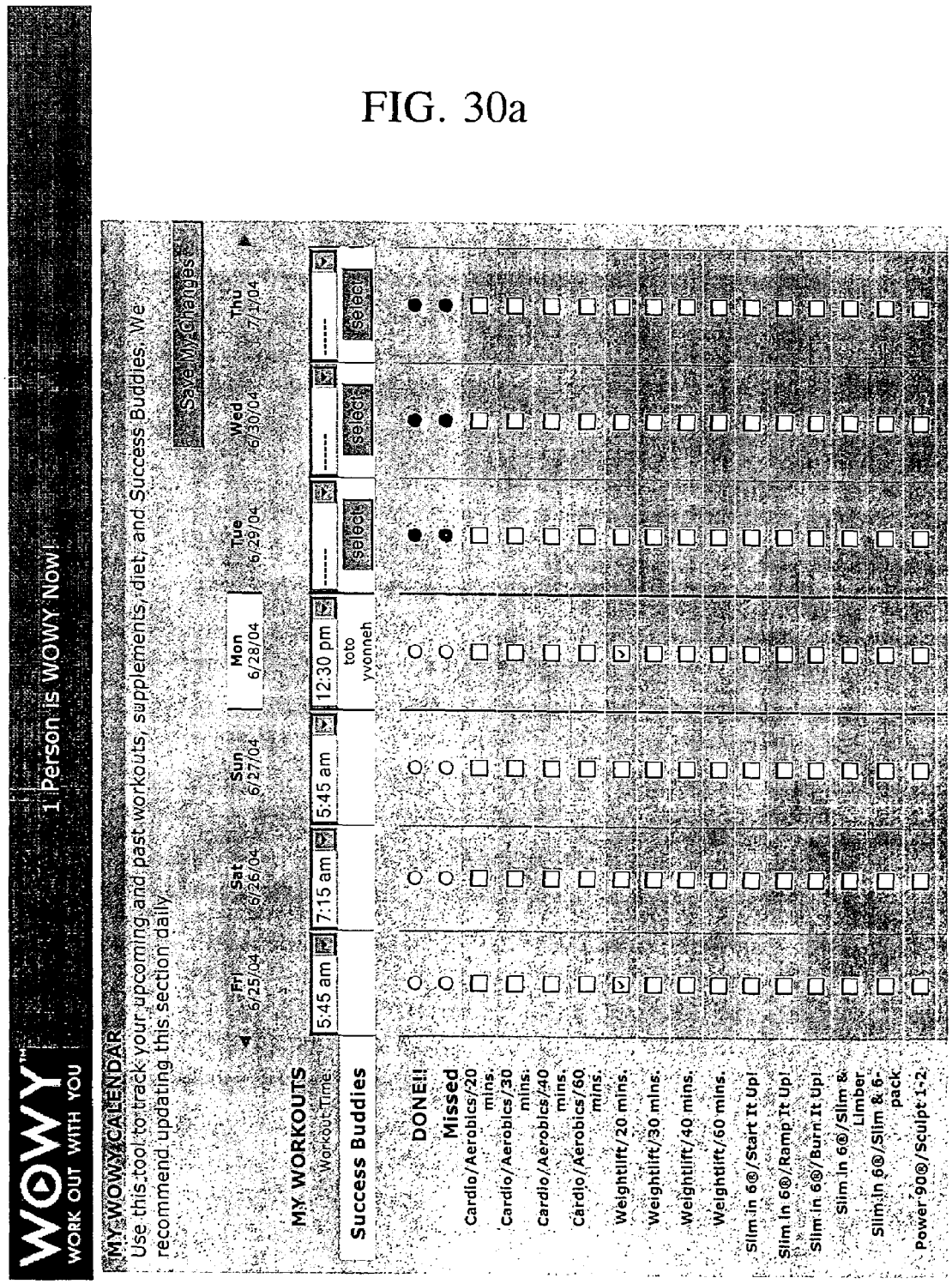
Figure 30B:
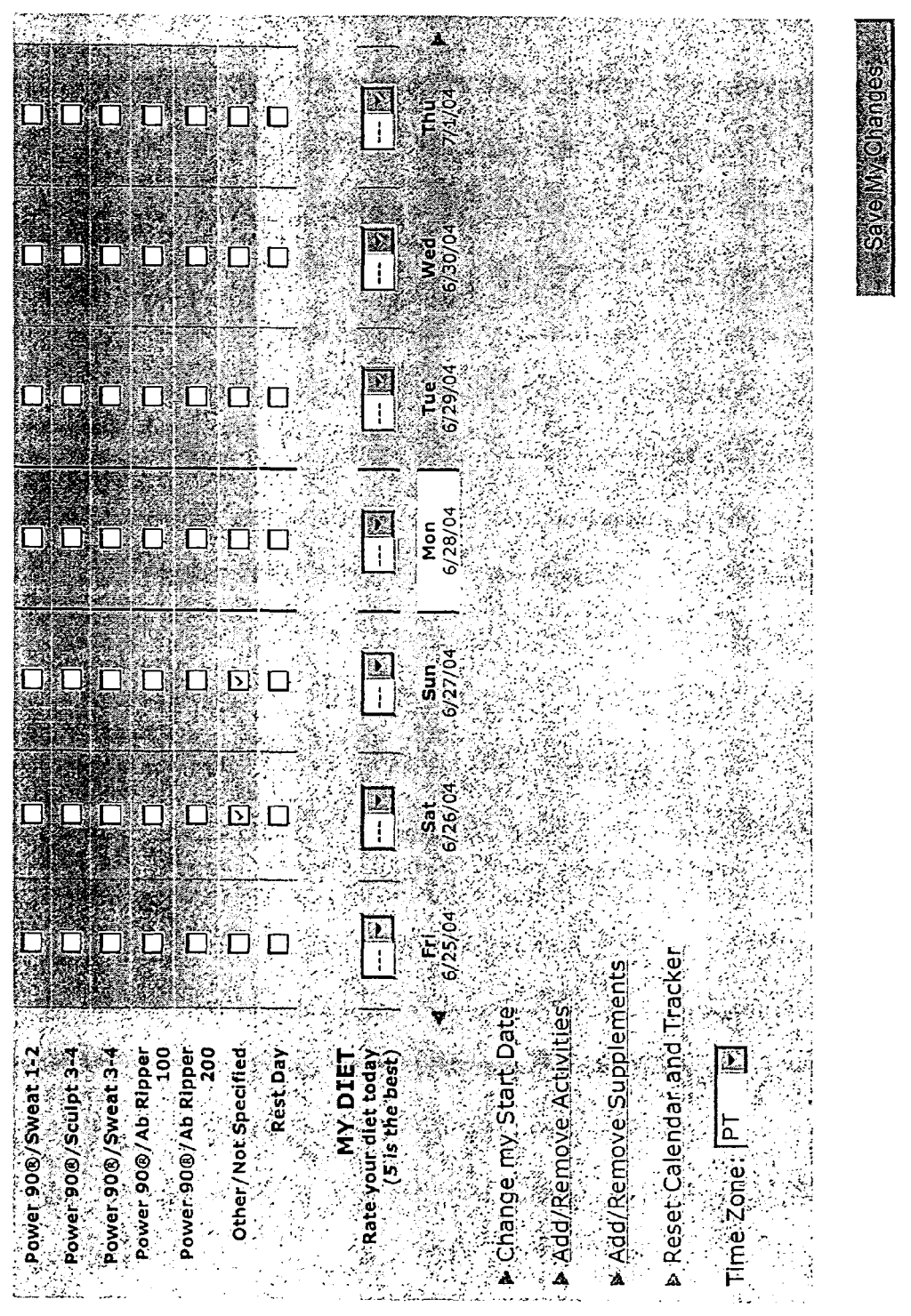

As discussed above, members will request Success Buddies for a workout from this page and be able see Success Buddies already assigned (see, e.g., FIGS. 30a-b). A row for Success Buddies is directly under the row for Workout Times. The cells are filled in various ways:

1) The member has never used Success Buddies feature before: "Select" button on all future dates. The member should also see a Select button on the current date if the member has no workout time scheduled yet or their workout time is later in the day. If the member clicks the Select button, the member's Calendar information is saved and the system directs the member to the Success Buddies Overview. If the member has a workout scheduled for the day that corresponds with the Select button and the workout start time is not in the past, the member will get the "Select a Success Buddy" button on the Success Buddy Overview page. If not, the member will get the "Schedule a Workout" button, which takes the member back to the WOWY Calendar page.

2) Previous Success Buddy system member and future date with no workout set: "Select" button. If member clicks it, the system verifies the member has indicated a time and activity for that day. If the member has, save the information and continue to Success Buddy Selector page for that workout. If not, the system will present an alert to let the member know that the member must set a workout before a Buddy can be selected.

3) Previous Buddy system member and future date with a workout scheduled but not in Buddy pool: "Select" button. If member clicks it, save data and continue to Success Buddy Selector.

4) Previous Buddy system member and future date with a workout set and in Buddy pool—show member the Success Buddies that are assigned to the member.

a) If the member is the only person in the Buddy pool, display "No buddies available" instead.

b) If there is more than one person in the pool, but the member's slot #1 is not filled (i.e. they were the first person but now there are other Buddies available), display SELECT** in red and linked to the Buddy Selector, so the member can fill that slot. The corresponding footnote also needs to display at the bottom of the page.

c) If the Buddy in slot #1 has changed their workout time, show that Buddy's name in red with an asterisk (buddyname*) and linked back to the Buddy Selector using the Changed Workout text. The corresponding footnote also needs to display at the bottom of the page.

5) Previous Buddy system member and current date—treated differently depending upon the current time versus the scheduled workout time.
   a) If no workout is scheduled, treat as future date. If member schedules a workout time that has already past and then clicks the Select button, use JavaScript alert box to inform them that they cannot select Buddies for a past workout and do not submit data.
   b) If workout time is still upcoming, treat the same as a future date.
   c) If workout time equals the current time or is 20 minutes or less past, display scheduled Buddies, but do not display "SELECT" or Buddy replacement links.
   d) If workout time is older than 20 minutes, treat as a past date.
6) Past date with no Buddies—blank.
7) Past date with Buddies—display the Buddies who "worked out with me". Buddies who missed the workout should disappear from the list. In one embodiment, a member must log in between 10 minutes before their scheduled time and 20 minutes after their scheduled time (the Workout Window) in order to be credited as attending the workout with their Buddies. If the member missed the workout, they would still see the Buddies who attended, but those Buddies would not see them.

In one embodiment, the data is a part of the member's account, so that old Buddy information remains in their Calendar even if a Buddy cancels their membership at a later time. For example, if member Gmanager works out with member yvonneh and then yvonneh cancels her membership a month later, member Gmanager should still be able to see her name when he look back through his Calendar.

In one embodiment, once a member has entered the Buddy pool, the member would be discouraged from changing the member's workout time because it would no longer match the member's Buddies' workouts. Thus, if a member is in the pool, the pull-down menu for that day should only show two options: previously scheduled workout time and "change." If the member selects the "change" menu item, the system saves the data and directs the member to the Change Workout Time page (wowy_buddies_reschedule.htm). For example, a Javascript "onChange" event handler may be used to trigger the submission as soon as the member selects "change" so the member cannot attempt to alter multiple workouts at once.

Referring back to FIGS. 22a-b, the WOWY Member page contains the following elements:
1) Photo or icon of the member.
2) Welcome message includes username and current day, date, and time in member's preferred time zone (or ET if not specified).
3) Next Scheduled Workout lists the activities, date, and time, of the member's next scheduled workout in member's preferred zone.
   a) The current day's workout is listed until 20 minutes after the scheduled time. For example, a 7:30 AM workout would be visible until 7:49 AM, at which time it switches to the next workout scheduled.
   b) If there is no workout scheduled, display "No Workout Scheduled. Set one up now." Instead of activity and date/time. The sentence "Set one up now" should be a link to the member's Calendar or to the Calendar Wizard (formerly known as Scheduler Wizard).
   c) If the member's previous workout was part of the Buddy pool but the member missed their workout, display "Your last start time was missed." In red text above the phrase, "Next Scheduled Workout". A member must log in between 10 minutes before their scheduled time and 20 minutes after their scheduled time (Workout Window) in order to be credited as attending the workout with their Buddies. This applies to the Buddy System only and should not affect "Done/Missed" settings in the Calendar. For example, if a member logs in 1 hour after their scheduled time, they will be considered absent in the Buddy System, but their Calendar will still mark their workout as Done.
4) The Success Buddies row shows the member their Buddies for that session.
   a) If the member does not have an upcoming workout scheduled, display "No Buddies selected. Learn more." The latter sentence is a link that goes to the Buddy Overview page.
   b) If the member has an upcoming workout scheduled, but does not have any Buddies attached, display "No Buddies selected. Choose one now!" The latter sentence is a link that goes to either the Buddy Overview page if the member has not previously participated in the Buddy system, or to the Buddy Selector if the member has participated.
   c) If the member has a scheduled workout and is already in the Buddy pool and:
      i) the current time is more than 10 minutes before the workout time, then Buddies' names are in black.
      ii) the current time is within the Workout Window, then the names of any Buddies who are active in WOWY NOW are in green.
      iii) a Buddy has changed their workout time, their username has an asterisk and is a link back to the Selector, similar to the WOWY Calendar. A footnote explains the asterisk. If the member has not replaced this Buddy by the time the workout is scheduled to start, the username and link disappears.
      iv) there are no Buddies selected, display a "SELECT**" link, similar to the WOWY Calendar. A footnote explains the double-asterisk. If the member has not selected a Buddy by the time the workout is scheduled to start, the link disappears.
5) My WOWY Calendar shows the current month calendar as it appears on the Tracker. No legend is needed.
6) My Diet Index for this month displays this month's diet rating average.
7) Update My Calendar link will go to the combined scheduler/tracker WOWY Calendar page. If the member does not have a Calendar, display "Create My WOWY Calendar" and link to the WOWY Calendar.
8) Weekly Goals are separated into their own page. The My Weekly Goals section of this page will display the most recent 3 goals. If there are no goals, please display "There are no current goals. Add goals now." And link to the Update Goals page.

Figure 31:
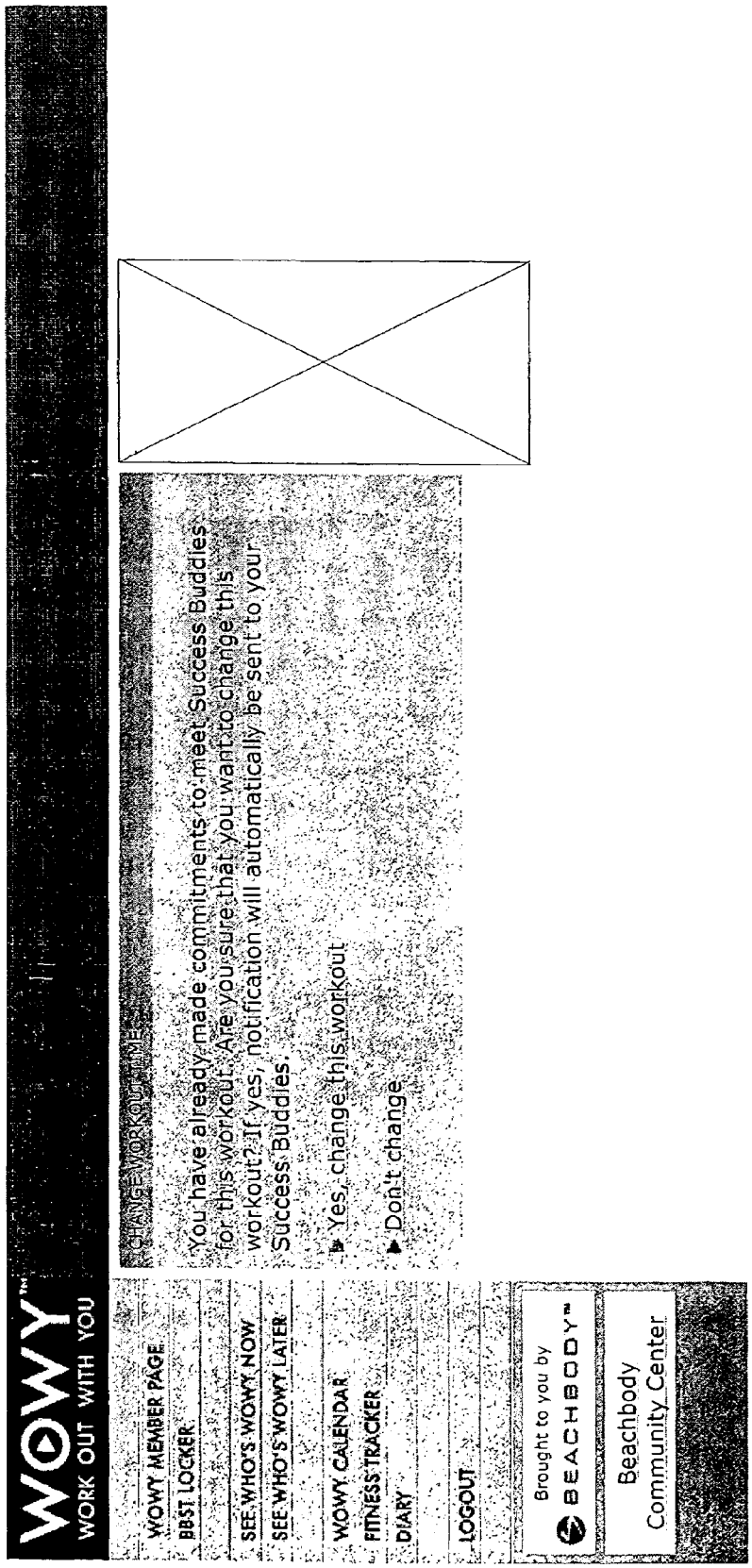

FIG. 31 illustrates a Change Workout Time (wowy_buddies_reschedule.htm) page. This page warns the member that the member may have existing commitments to Success Buddies for this workout and that the member's Buddies will be notified if they need to change the time. If the member selects "Don't change", return the member to the Calendar. If the member selects "Yes, change this workout," the system will:
1) send out an email (an example of which is provided below) to all their Buddies for that workout;
2) remove the member's Buddies and return the Buddies to the Buddy Pool, if applicable; and
2) return the member to the Calendar.

The member's Calendar should then have the full list of times and the "Select" button for that day again.

Email to Buddies:
To:
[primary address of Buddy]
From:
SuccessBuddies@wowy.com
Subject:
Change of WOWY Success Buddy for Tuesday, May 12 at 8:30 AM ET (in Buddy's preferred zone)
Body:
(username) has changed their workout time and will no longer be available to WOWY at (time/date—Buddy's time zone).
If you selected (username) as your Success Buddy, you many replace them with another Buddy by logging into your account at www.wowy.com and going to your WOWY Calendar. In the row labeled Success Buddies, you will see (username)'s name is now a link that you can use to select another Buddy.

---

You have received this email because you requested a Success Buddy at www.wowy.com for your workout on (date/time). Please do not reply to this email.

Figure 32:
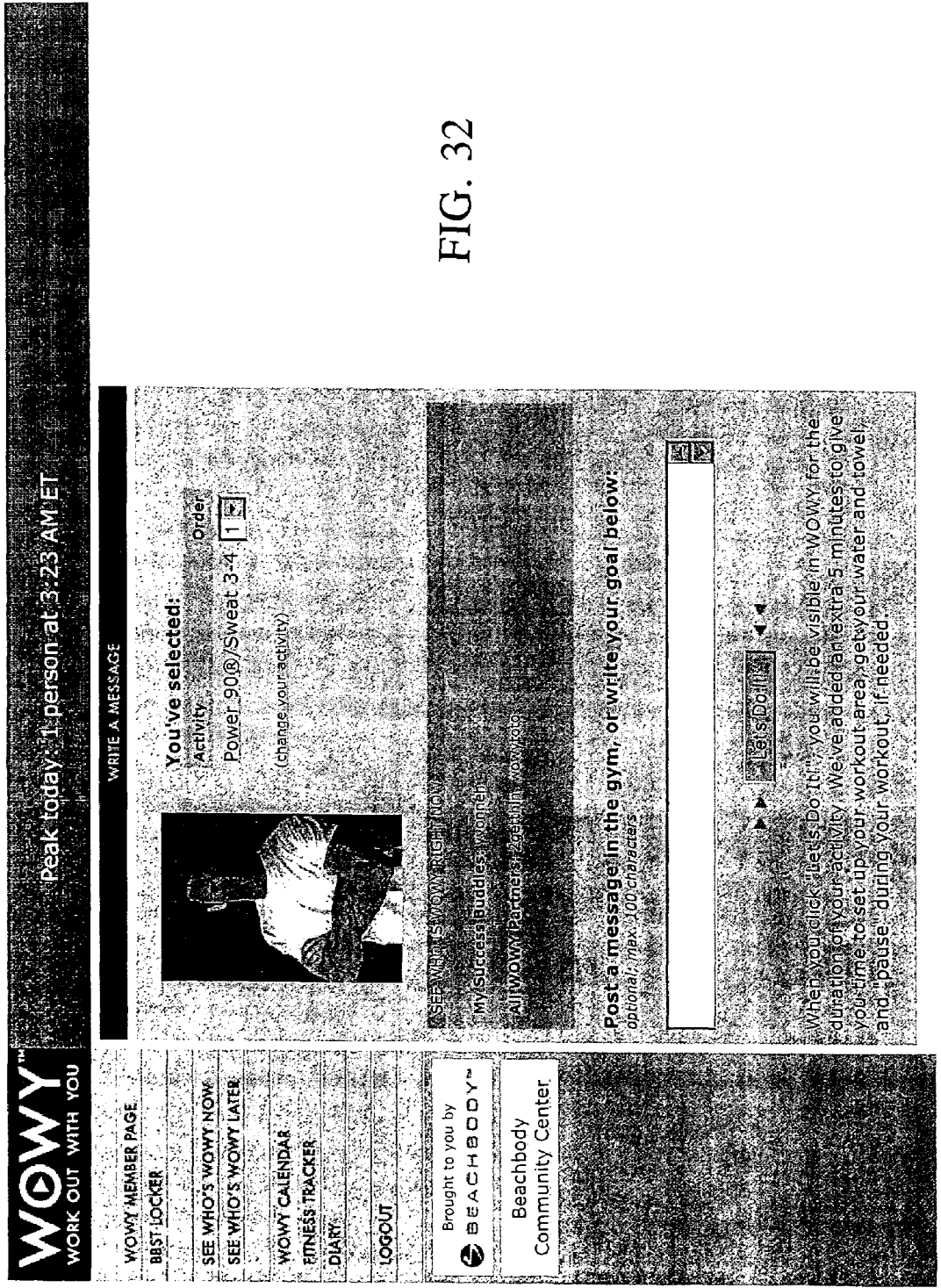

A WOWY Message/Goals (wowynow_goal.htm) page, as shown in FIG. 32 is provided to give members a view into WOWY NOW on the Goals/Message page, so they can write messages to specific members. In one embodiment, the member's Success Buddies are listed first, then any WOWY Groups they belong to, followed by all others.

As discussed above, if the member is over 20 minutes late logging into WOWY NOW, they have "missed" their workout with their Buddies and would no longer see a row for Success Buddies. If any of their Buddies happen to still be working out, the member would just see them mixed into the general population.

Timer

Figure 33:
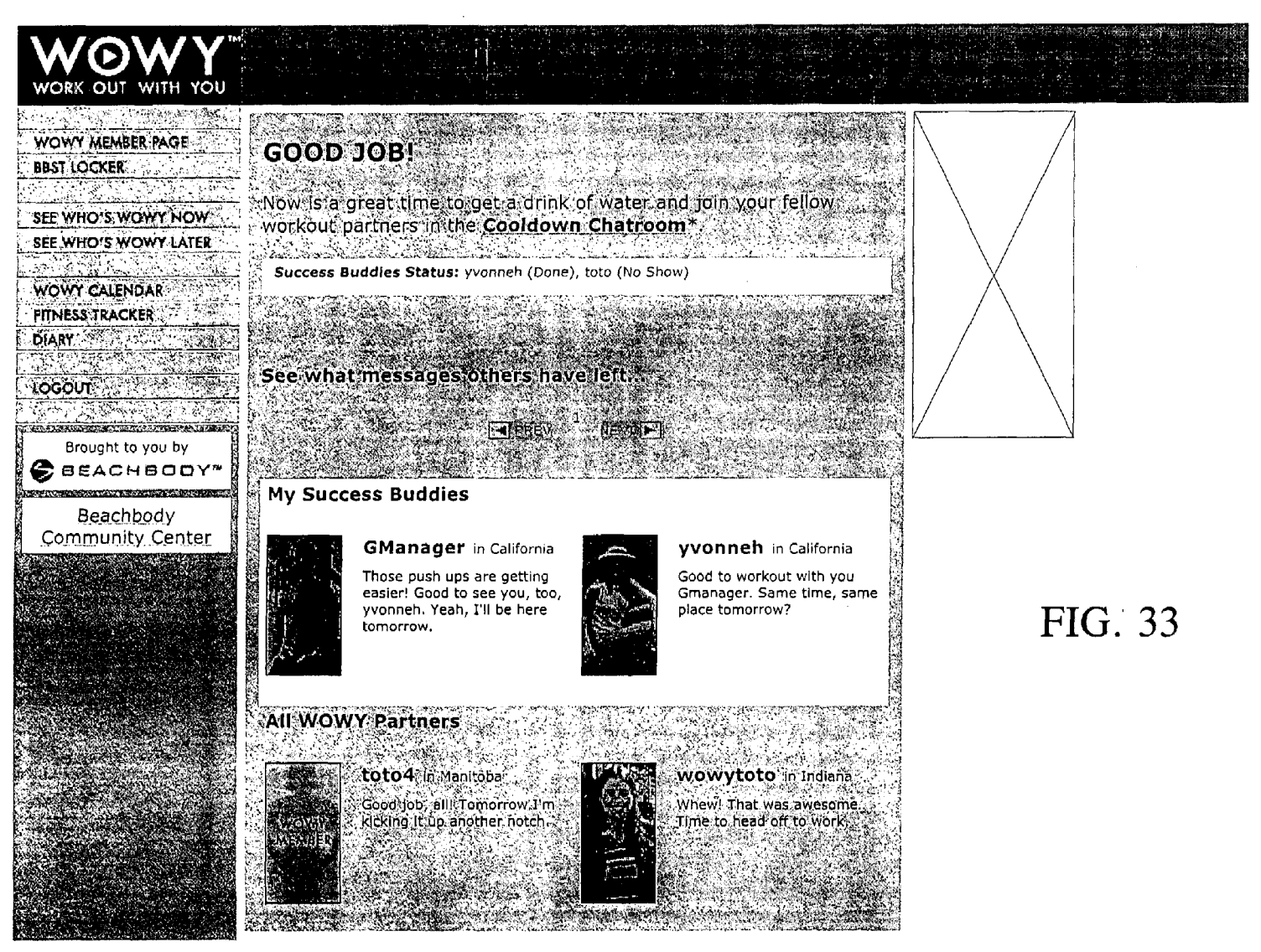

During a workout, a Timer (wowynow_timer.htm) page as shown in FIG. 33 is displayed to the member. If the member signed up for Success Buddies, the member and the member's Buddies are displayed on the Timer page above all other workout groups. In one embodiment, the Success Buddies row is displayed with a white background, but the information in the bio boxes used in this section is similar to other WOWY members.

In one embodiment, if the member is over 20 minutes late logging into the workout, the member has "missed" the workout with their Buddies and would no longer see a row for Success Buddies. If any of their Buddies happen to still be working out, the member would just see them mixed into the "general population." Conversely, if a Buddy is over 20 minutes late, the member would not see them among the Success Buddies but would see them mixed in with the "general population."

It should be noted that it is possible for members to put themselves in the Buddies pool, but never be selected by any other members as Buddies. For example, they may have signed up for an odd time period, like 2:30 AM, and no one else ever joined. In those cases, they should still show up in the Success Buddies row.

Figure 34A:
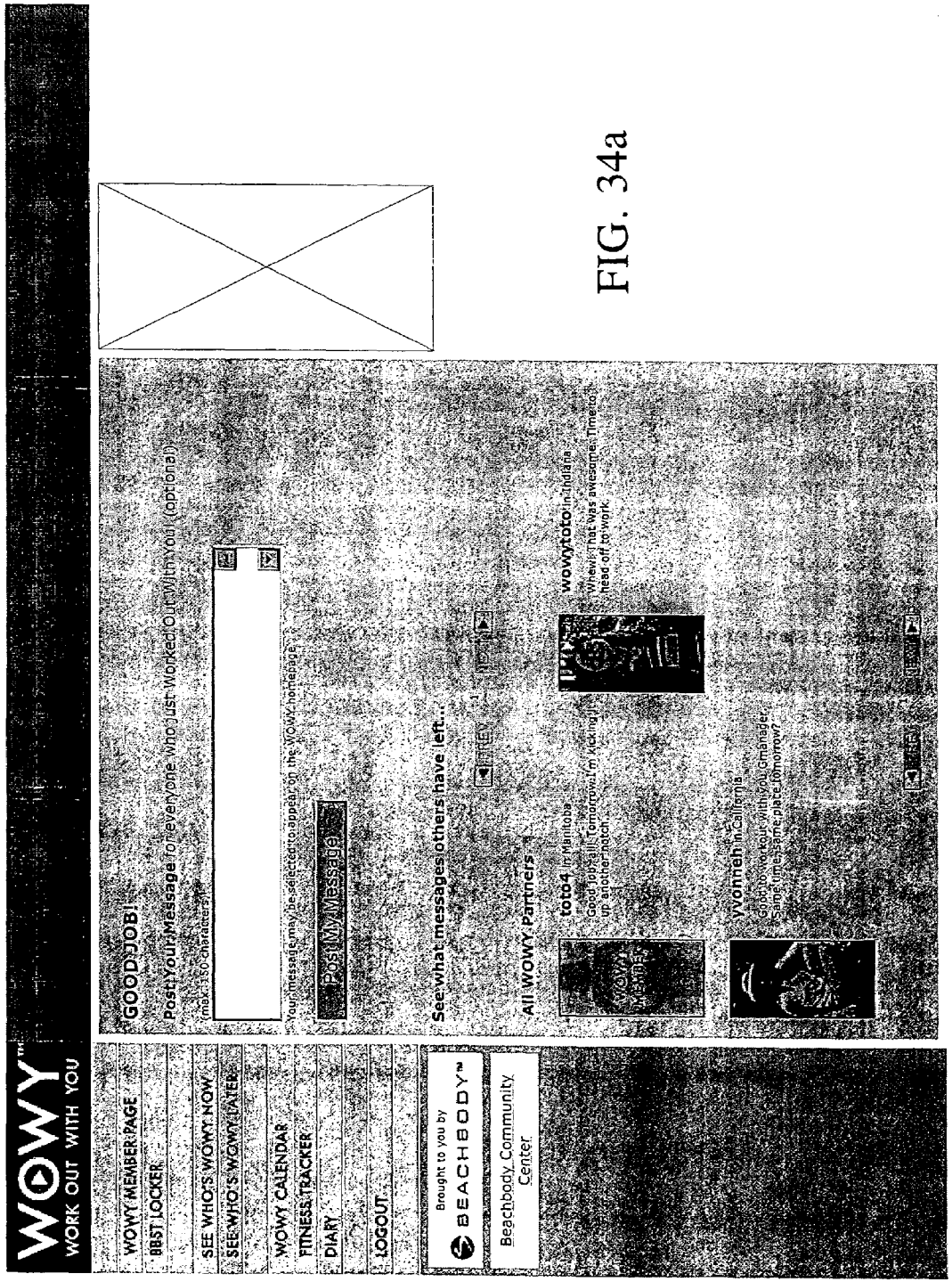
Figure 34B:
Figure 35A:
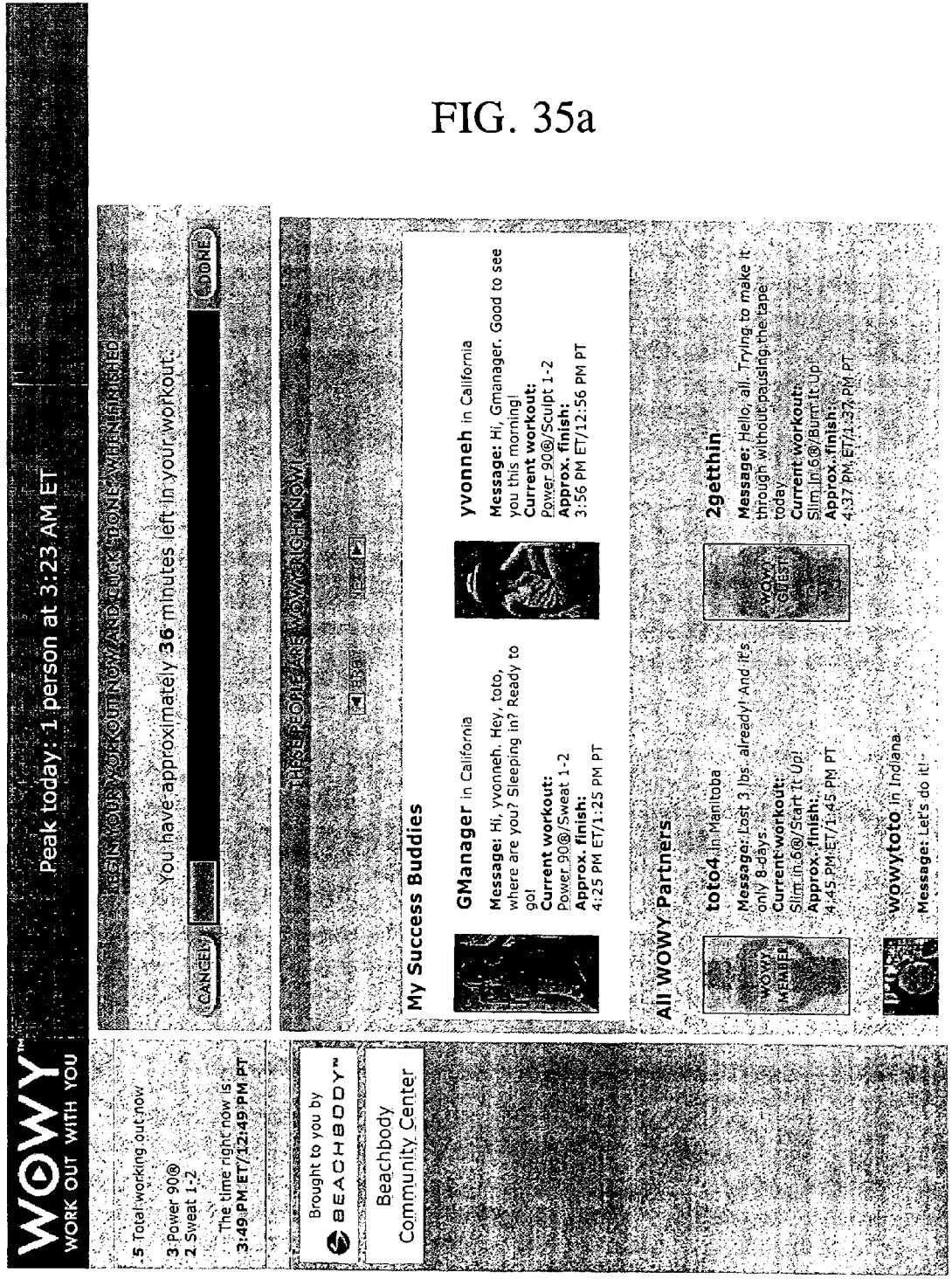
Figure 35B:
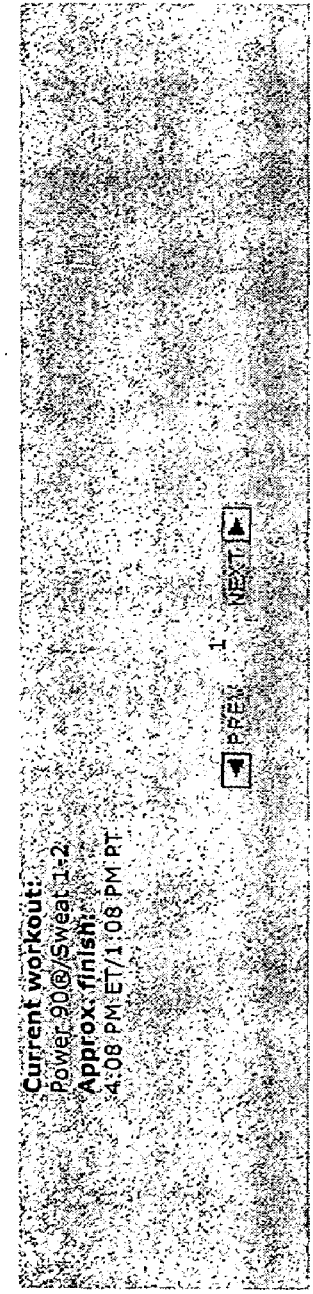

In FIGS. 34a-b, a WOWY NOW Done (wowynow_done.htm) page is shown once the member has completed working out. In one embodiment, as on the member's WOWY NOW Goals/Message and Timer pages, the member's Buddies are shown above all other members. The Done page also includes an attendance summary to show the member which Buddies have and haven't attended.

Like the Timer page, the exit messages submitted from the member's Buddies are displayed above other messages. Again, the color of the cells for the rows holding Buddies messages are white, but the other information in the bio boxes themselves are not changed.

In addition, there is an "attendance list" just below the Buddies' messages and before the remaining messages. Any Buddies who logged in to WOWY NOW between 10 minutes before the scheduled workout and 20 minutes after are listed in green. If they are still active, their username is followed by "(In WOWY)", otherwise it is followed by "(Done)". If a Buddy is still IN WOWY but did not log in during the required time, their username is displayed in red followed by "(In WOWY/Late)". If a Buddy did not log in at all, their username is displayed in red followed by "(No Show)". Again, if the member is has not logged in during the required time, they would not see separate rows for Success Buddies.

Figure 36:
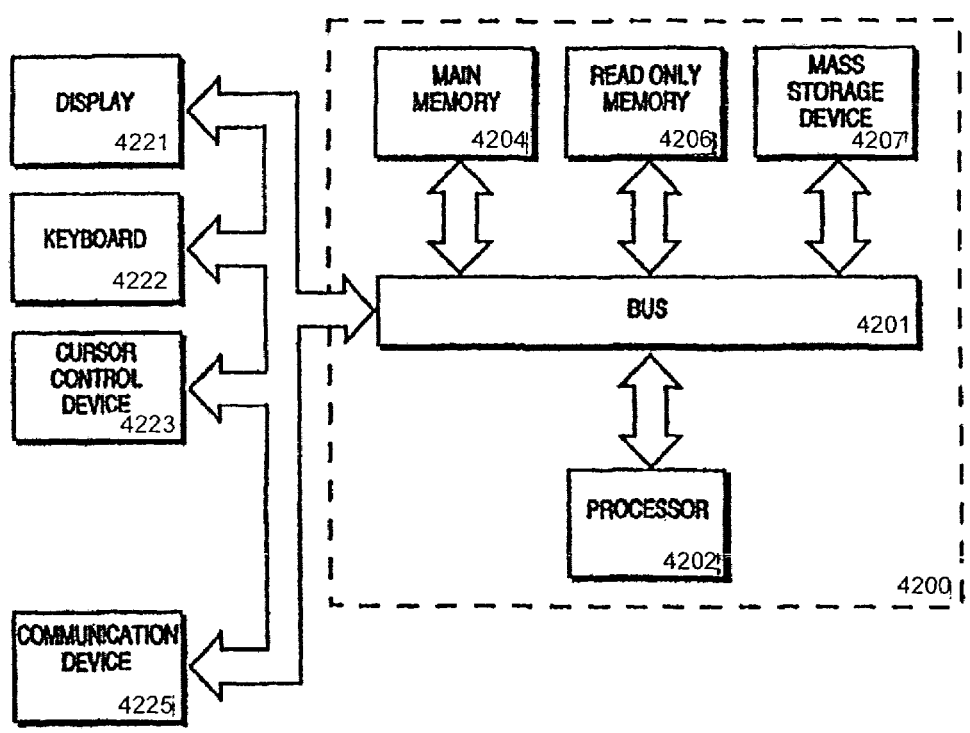
FIG. 36 is a block diagram of a computer system that may be used in the virtual online gym system, configured in accordance with a preferred embodiment of the present invention; and, FIG. 37 is a network diagram illustrating a network of computer systems that may be used in the virtual online gym system, configured in accordance with a preferred embodiment of the present invention.

FIG. 36 illustrates an example of a computer system 4200 in which the features of the present invention may be implemented. The computer system 4200 includes a bus 4201 for communicating information between the components in the computer system 4200, and a processor 4202 coupled with the bus 4201 for executing software code, or instructions, and processing information. The computer system 4200 further comprises a main memory 4204, which may be implemented using random access memory (RAM) and/or other random memory storage device, coupled to the bus 4201 for storing information and instructions to be executed by the processor 4202. The main memory 4204 also may be used for storing temporary variables or other intermediate information during execution of instructions by the processor 4202. The computer system 4200 also includes a read only memory (ROM) 4206 and/or other static storage device coupled to the bus 4201 for storing static information and instructions for processor 4202.

Further, a mass storage device 4207, such as a magnetic disk drive and/or a optical disk drive, may be coupled to the computer system 4200 for storing information and instructions. The computer system 4200 can also be coupled via bus 4201 to a display device 4221, such as a cathode ray tube (CRT) or a liquid crystal display (LCD), for displaying information to a user so that, for example, graphical or textual information may be presented to the user on display device 4221. Typically, an alphanumeric input device 4222, including alphanumeric and other keys is coupled to bus 4201 for communicating information and/or command the user can selections to processor 4202. Another type of user input device show in the figure is a cursor control device 4223, such as a conventional mouse, touch mouse, trackball, track pad or other type of cursor direction keys for communicating direction information and command selection to processor 4202 and for controlling movement of a cursor on display 4221. Although not illustrated, the computer system 4200 may optionally include video, camera, speakers, sound card, and many other conventional options. Various types of input devices, including, but not limited to the input devices described herein unless otherwise noted, allow the user to provide command or input to the computer system 4200. For example, in the various descriptions contained herein, reference may be made to a user "selecting," "clicking," or "inputting," and any grammatical variations thereof, one or more items in a user interface. These should be understood to mean that the user is using one or more input devices to accomplish the input.

A communication device 4225 is also coupled to bus 4201 for accessing other computer systems, as described below. The communication device 4225 may include a modem, a network interface card, or other well-known interface devices, such as those used for interfacing with Ethernet, Token-ring, or other types of networks. In any event, in this manner, the computer system 4200 may be coupled to a number of other computer systems via a network infrastructure such as the infrastructure illustrated and described below.

Figure 37:
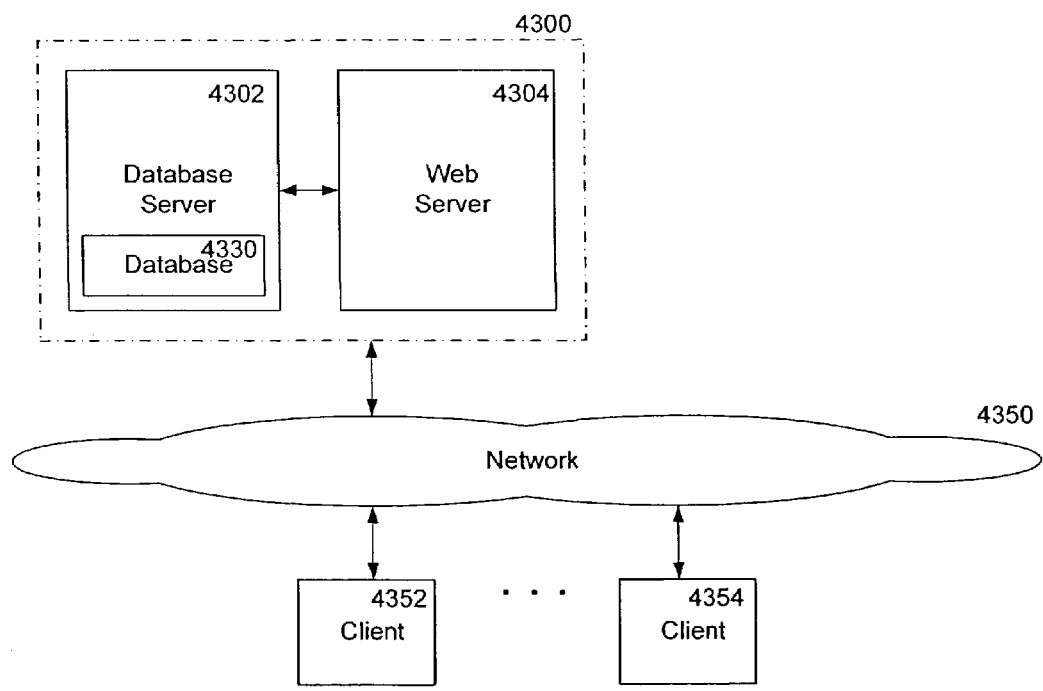

FIG. 37 illustrates a network including a server system 4300 having a database server 4302 for storing database 4330 and a web server 4304 that stores the instructions necessary to access and present the information from, as well as store information into, database 4330. In one preferred embodiment, information about members, including the groups to which each member belongs, exercise schedules, Buddy lists, security information and other information needed to operate the website is stored in database 4330. In addition, information needed to render and create the screens and graphical user interface described herein are stored on server system 4300. Members, using a client computer such as a client 4352 and a client 4354, accesses server system 4300 through a network 4350. In the illustrated embodiment, network 4350 represents a variety of networks that may include one or more local area networks as well as wide area networks. The functionality provided by database server 4302, web server 4304, client 4352 and client 4354 may be implemented using a computer system having the characteristics of the computer system 4200 described above. It should be noted, however, that the specific implementation of the computer system or systems used to describe the present invention is not to be limiting unless otherwise specifically noted. For example, the functionality provided by database server 4302 and web server 4304 may be combined in one computer system. Further, the functionality provided by database server 4302 and 4304 may be redistributed over several computers.

As described above, the user may interact with the information stored in server system 4300 through a graphical user interface. In the above description, the graphical user interface is implemented using one or more web pages (which may be referred to as "pages," "screens," or "forms") provided by the web server 4304 accessible by the user using any Internet web browser software, such as the Internet Explorer™ browser provided by Microsoft Corp., on a client computer such as client 4352. In another embodiment, one or more custom software programs can be created to implement the system described herein. Of course, the web server 4304 may itself have browser software installed on it so as to be accessed by the user. Further, throughout the description of the various embodiments of the invention herein, references are made to the user performing such actions as selecting buttons, executing searches or updates on the database 4330. In one preferred embodiment, these requests are generated by the user interacting with the browser. For example, one or more pages described herein may be forms that include fields in which the user may type in such data. Once the user has provided such data, the user may select a button or link on the page to request an update of the database 4330 with the information. The browser will send the web server 4304 a link that includes the information being sent as well as the request to update the database 4330. Depending on the browser being used, the user may need to reload the page being viewed so as to "refresh" the view of the page. In one preferred embodiment, there are two ways to refresh the view: (1) with the refresh feature provided by the user's browser, or (2) a refresh button provided on the page. In one preferred embodiment, the refresh button is displayed as an envelope icon. Either selection will request the web server 4304 to send the updated page so that the browser may refresh the page.

The various embodiments of the invention described herein, along with other variations are further detailed in the document entitled "Success Buddies Functional Spec" as attached hereto in the Appendix. This document and the included figures are incorporated by reference in their entirety in this specification.

The embodiments described above are exemplary embodiments of a the present invention. Those skilled in the art may now make numerous uses of, and departures from, the above-described embodiments without departing from the inventive concepts disclosed herein.

What is claimed is:

1. A virtual workout community system for serving members that are not all working out at the same physical location, the system comprising:
    a server having a processor and a memory coupled to the processor, the memory having instructions stored therein that, when executed by the processor, causes the processor to perform the steps of:
        serving a schedule of available exercise programs to a first member at a first client computer;
        in response to serving the schedule, receiving, from the client computer, a selection indicating a first exercise program from the schedule of available exercise programs, wherein the selection is associated with a defined start time at which the first exercise program is scheduled to begin and a program length;
        receiving a request from the first member to the virtual workout community identify available workout buddies belonging to the virtual workout community for the first exercise program;
        in response to receiving the request to identify available workout buddies, serving to the first client computer information identifying at least one other member recorded as having selected the first exercise program and being available as a workout buddy;
        receiving a selection indicating selection of a second member of the virtual workout community selected from the information identifying at least one other member served to the first client computer;
        reporting the selection of the second member by transmitting a message to an address for the second member;
        maintaining records of attendance information indicating whether the first member and the second member are logged into the virtual workout community system within a limited time window defined to begin shortly before the defined start time and to end before the first exercise program is completed; and
        reporting the attendance information to clients operated by the first member and the second member, respectively, in a format configured to encourage fulfillment of member commitments for participating in scheduled exercise programs with workout buddies.

2. The system of claim 1, wherein the instructions stored in the memory further includes instructions that, when executed by the processor, causes the processor to perform the step of providing the first member with access to an online chat room.

3. The system of claim 2, wherein the instructions stored in the memory that causes the processor to perform the step of providing the first member with access to the online chat room further includes instructions that, when executed by the processor, causes the processor to perform the step of restricting the access to the online chat room to a predetermined period before the start time.

4. The system of claim 2, wherein the instructions stored in the memory that causes the processor to perform the step of providing the first member with access to the online chat room further includes instructions that, when executed by the processor, causes the processor to perform the step of directing the first member to the online chat room after the first exercise program is finished.

5. The system of claim 1, wherein the instructions stored in the memory further includes instructions that, when executed by the processor, causes the processor to perform the steps of receiving a goal selection from the first member.

6. The system of claim 1, wherein the program length includes a delay period at the beginning portion of the program length.

7. The system of claim 1, wherein the schedule of available exercise programs is limited to a portion of a full list of programs.

8. The system of claim 7, wherein the instructions stored in the memory further includes instructions that, when executed by the processor, causes the processor to perform the step of limiting the schedule of available exercise programs in response to information from a profile of the first member.

9. The system of claim 1, wherein the instructions stored in the memory further includes instructions that, when executed by the processor, causes the processor to perform the step of receiving a request from the first member to the second member in a first workout group for a commitment to performing the first exercise program.

10. The system of claim 9, wherein the instructions stored in the memory further includes instructions that, when executed by the processor, causes the processor to perform the step of sending a request notification to the second member.

11. The system of claim 9, wherein the instructions stored in the memory further includes instructions that, when executed by the processor, causes the processor to perform the step of receiving a reply from the second member to the request by the first member.

12. The system of claim 9, wherein the instructions stored in the memory further includes instructions that, when executed by the processor, causes the processor to perform the step of determining if both the first member and the second member fulfilled the commitment.

13. The system of claim 12, wherein the instructions stored in the memory that causes the processor to perform the step of determining if both the first member and the second member fulfilled the commitment includes instructions that, when executed by the processor, causes the processor to perform the steps of: determining if the first member begins the first exercise program within the limited time window; and, determining if the second member also begins the first exercise program within the limited time window.

14. The system of claim 13, wherein the instructions stored in the memory that causes the processor to perform the step of determining if both the first member and the second member fulfilled the commitment includes instructions that, when executed by the processor, causes the processor to perform the step of notifying both the first member and the second member of whether each of them respectively began the first exercise program within the limited time window.

15. The system of claim 9, wherein the second member belongs to a first workout group and the instructions stored in the memory further includes instructions that, when executed by the processor, causes the processor to perform the steps of:
receiving a selection for the first member to join the first workout group; and, displaying a list of members that belong to the first workout group.

16. The system of claim 1, wherein the instructions stored in the memory further includes instructions that, when executed by the processor, causes the processor to perform the step of receiving a request from the first member to join a first workout group.

17. The system of claim 16, wherein the instructions stored in the memory further includes instructions that, when executed by the processor, causes the processor to perform the step of selecting the schedule of available exercise programs based on a list of exercise programs available to the first workout group.

18. The system of claim 1, wherein the instructions stored in the memory further includes instructions that, when executed by the processor, causes the processor to perform the step of updating respective virtual calendars of the first and second members on which the future workout session is scheduled, to indicate a commitment to the future workout session.

19. A virtual workout community system for members that are not all working out at the same physical location, the system comprising:
a server having a processor and a memory coupled to the processor, the memory having instructions stored therein that, when executed by the processor, causes the processor to perform the steps of:
receiving a request for access to the virtual workout community system from a first member at a first client computer;
receiving a selection for a exercise program having a program length from a plurality of available exercise programs from the first member;
receiving a request from the first member to schedule a future workout session with a second member of the virtual workout community system; and
confirming a commitment to the future workout session from first and the second members; and
updating respective virtual calendars of the first and second members on which the future workout session is scheduled, to indicate the commitment to the future workout session; and
updating the respective virtual calendars a second time after the future workout session is completed to indicate whether each of the first and second members fulfilled the commitment by being logged into the virtual workout community system within a predetermined period less than the program length and beginning prior to a defined start time for the exercise program.

* * * * *